United States Patent [19]

Kaku et al.

[11] Patent Number: 4,607,230
[45] Date of Patent: Aug. 19, 1986

[54] RECEIVER UNIT HAVING SYNCHRONOUS PULL-IN CIRCUIT

[75] Inventors: Takashi Kaku, Tama; Chihiro Endo, Yokohama, both of Japan

[73] Assignee: Fujitsu Limited, Kawasaki, Japan

[21] Appl. No.: 770,175

[22] Filed: Aug. 28, 1985

[30] Foreign Application Priority Data

Aug. 29, 1984 [JP] Japan .............................. 59-179565

[51] Int. Cl.[4] .............................................. H03D 3/00
[52] U.S. Cl. ..................................... 329/50; 329/110; 329/126; 375/81; 375/94; 375/120; 455/257
[58] Field of Search ................. 329/50, 110, 122, 124, 329/126; 375/81, 110, 118, 119, 120, 94; 455/257, 258, 260, 265

[56] References Cited

U.S. PATENT DOCUMENTS 4,540,948  9/1985  Ryu ...................................... 329/122
4,567,599  1/1986  Mizoguchi ............................ 375/14

Primary Examiner—Siegfried H. Grimm
Attorney, Agent, or Firm—Staas & Halsey

[57] ABSTRACT

In a receiver unit, a synchronous pull-in circuit is formed. The synchronous pull-in circuit is comprised of a transversal filter having a roll-off characteristic (roll-off filter), a timing discriminator for extracting a timing signal contained in a received signal and a decision part for detecting a phase deviation between the thus extracted timing signal and an internal clock by which the receiver unit itself is synchronized. The roll-off filter is provided with a plurality of taps, the tap coefficients of which are varied in accordance with the phase deviation, so that said timing signal is synchronized with the internal clock.

26 Claims, 35 Drawing Figures

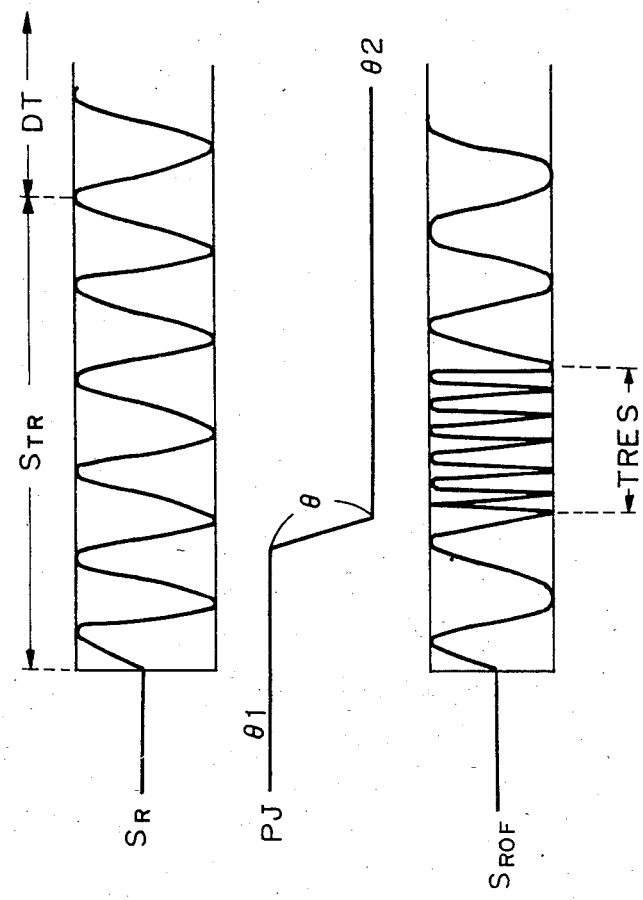

Fig. 12

| PHASE DEVIATION θ | DECISION OUTPUT ||||||  $C_1$ TO $C_n$ |
|---|---|---|---|---|---|---|---|
| | $d_1$ | $d_2$ | $d_3$ | $d_4$ | $d_5$ | $d_6$ | |
| 0°~10°    | 0 | 0 | 0 | 0 | 0 | 0 | 0°   |
| 10°~30°   |   |   | 1 | 0 | 0 | 0 | 20°  |
| 30°~50°   | 0 | 0 | 0 | 1 | 0 | 0 | 40°  |
| 50°~70°   |   |   | 0 | 0 | 1 | 0 | 60°  |
| 70°~90°   |   |   | 0 | 0 | 0 | 1 | 80°  |
| 90°~110°  |   |   | 0 | 0 | 0 | 1 | 100° |
| 110°~130° |   |   | 0 | 0 | 1 | 0 | 120° |
| 130°~150° | 1 | 0 | 0 | 1 | 0 | 0 | 140° |
| 150°~170° |   |   | 1 | 0 | 0 | 0 | 160° |
| 170°~180° |   |   | 0 | 0 | 0 | 0 | 180° |
| 180°~190° |   |   | 0 | 0 | 0 | 0 | 180° |
| 190°~210° |   |   | 1 | 0 | 0 | 0 | 200° |
| 210°~230° | 1 | 1 | 0 | 1 | 0 | 0 | 220° |
| 230°~250° |   |   | 0 | 0 | 1 | 0 | 240° |
| 250°~270° |   |   | 0 | 0 | 0 | 1 | 260° |
| 270°~290° |   |   | 0 | 0 | 0 | 1 | 280° |
| 290°~310° |   |   | 0 | 0 | 1 | 0 | 300° |
| 310°~330° | 0 | 1 | 0 | 1 | 0 | 0 | 320° |
| 330°~350° |   |   | 1 | 0 | 0 | 0 | 340° |
| 350°~360° |   |   | 0 | 0 | 0 | 0 | 0°   |

TO ROF 4

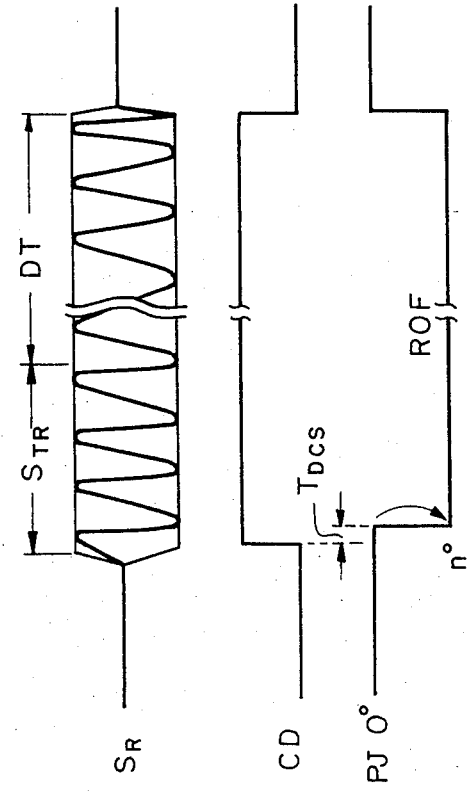

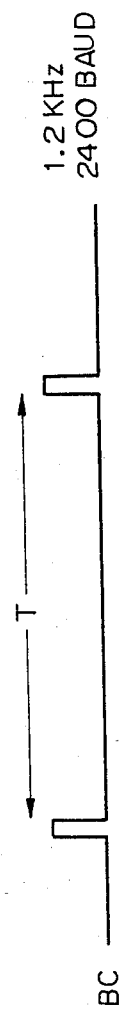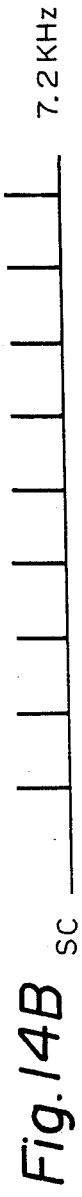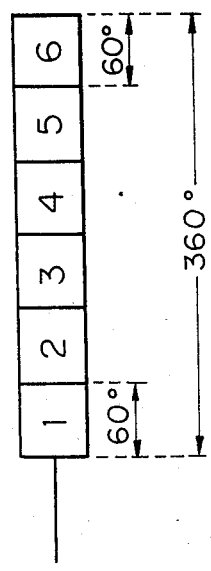
Fig.14A BC
Fig.14B SC
Fig.14C

Fig. 15

| PHASE DEVIATION θ | TAP COEFFICIENTS | | | | | | | | | | | | |
|---|---|---|---|---|---|---|---|---|---|---|---|---|---|
| | $C_1$ | $C_2$ | $C_3$ | $C_4$ | $C_5$ | $C_6$ | $C_7$ | ... | $C_{n-1}$ | $C_n$ | | | |
| 0° | $a_1$ | $a_2$ | $a_3$ | $a_4$ | $a_5$ | $a_6$ | $a_7$ | | $a_{n-1}$ | $a_n$ | | | |
| 20° | $b_1$ | $b_2$ | $b_3$ | $b_4$ | $b_5$ | $b_6$ | $b_7$ | | $b_{n-1}$ | $b_n$ | | | |
| 40° | $d_1$ | $d_2$ | $d_3$ | $d_4$ | $d_5$ | $d_6$ | $d_7$ | | $d_{n-1}$ | $d_n$ | | | |
| 60° | | $a_1$ | $a_2$ | $a_3$ | $a_4$ | $a_5$ | $a_6$ | | $a_{n-2}$ | $a_{n-1}$ | | | |
| 120° | | | $a_1$ | $a_2$ | $a_3$ | $a_4$ | $a_5$ | | $a_{n-3}$ | $a_{n-2}$ | | | |
| 180° | | | | $a_1$ | $a_2$ | $a_3$ | $a_4$ | | $a_{n-4}$ | $a_{n-3}$ | | | |
| 240° | | | | | $a_1$ | $a_2$ | $a_3$ | | $a_{n-5}$ | $a_{n-4}$ | | | |
| 300° | | | | | | $a_1$ | $a_2$ | | $a_{n-6}$ | $a_{n-5}$ | | | |

| θ | TAP COEFFICIENT |||||||||||||||||||||
|---|---|---|---|---|---|---|---|---|---|---|---|---|---|---|---|---|---|---|---|---|---|
| | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ | $C_{17}$ | $C_{18}$ | $C_{19}$ | $C_{20}$ | $C_{21}$ |
| 0° | | | | | | | | | | | | | | | | ✕ | ✕ | ✕ | ✕ | ✕ | ✕ |
| 60° | ✕ | ✕ | ✕ | | | | | | | | | | | | | | ✕ | ✕ | ✕ | ✕ | ✕ |
| 120° | ✕ | ✕ | ✕ | ✕ | | | | | | | | | | | | | | ✕ | ✕ | ✕ | ✕ |
| 180° | ✕ | ✕ | ✕ | ✕ | | | | | | | | | | | | | | | ✕ | ✕ | ✕ |
| 240° | ✕ | ✕ | ✕ | ✕ | ✕ | | | | | | | | | | | | | | | ✕ | ✕ |
| 300° | | | | | ✕ | | | | | | | | | | | | | | | | ✕ |

Fig. 20

| $\theta$ | | C | $\theta_0$ |
|---|---|---|---|
| 1 | −10°~+10° | 0° | 0° |
| 2 | 10°~30° | 0° | 20° |
| 3 | 30°~50° | 0° | 40° |
| 4 | 50°~70° | 60° | 0° |
| 5 | 70°~90° | 60° | 20° |
| 6 | 90°~110° | 60° | 40° |
| 7 | 110°~130° | 120° | 0° |
| 8 | 130°~150° | 120° | 20° |
| 9 | 150°~170° | 120° | 40° |
| 10 | 170°~190° | 180° | 0° |
| 11 | 190°~210° | 180° | 20° |
| 12 | 210°~230° | 180° | 40° |
| 13 | 230°~250° | 240° | 0° |
| 14 | 250°~270° | 240° | 20° |
| 15 | 270°~290° | 240° | 40° |
| 16 | 290°~310° | 300° | 0° |
| 17 | 310°~330° | 300° | 20° |
| 18 | 330°~350° | 300° | 40° |

RECEIVER UNIT HAVING SYNCHRONOUS PULL-IN CIRCUIT

BACKGROUND OF THE INVENTION

1. Field of the Invention

The present invention relates to a receiver unit having a synchronous pull-in circuit. For example, a receiver unit of a modulator and demodulator (MODEM) contains a synchronous pull-in circuit which is operative to pull an internal clock of the receiver unit to a timing signal contained, as a clock, in the received signal at the receiver unit. The pull-in operation is performed such that the internal clock is synchronized in both phase and frequency with the timing signal. Particularly, the present invention concerns an improved synchronous pull-in circuit able to complete the pull-in operation in a very short time.

2. Description of the Related Art

In recent years, it has been a common practice to use existing telephone lines for data transmission. Existing telephone lines are usually analog lines in form. Therefore, it is necessary to employ a MODEM which modulates digital data signals into corresponding analog data signals and demodulates the latter signals into the former.

The problem is that the transmission characteristics of the telephone lines to which the MODEM receiver unit is connected are, in general, not the same. Due to this fact, a pull-in operation is essential for each MODEM receiver unit. A pull-in operation is usually achieved by, first, sending a so-called training signal from a transmitter side to the receiver unit every time data transmission is to be started. The internal clock of the MODEM receiver unit is then synchronized with the timing signal contained in the training signal. After the pull-in operation, the MODEM receiver unit can start inherent data processing correctly in response to the successive received signal.

During this pull-in operation, other pull-in operations are sometimes also performed in parallel, such as for equalization of an automatic equalizer (EQL), automatic gain control (AGC), and in carrier automatic phase control (CAPC). Through the synchronous pull-in operations, as mentioned previously, the internal clock of the MODEM receiver unit is synchronized in phase and frequency with the timing signal, i.e., baud rate clock, contained in the received signal at the MODEM receiver unit. During the reception of the training signal, the pull-in operation regarding the phase is especially important.

In a prior art technique for a synchronous pull-in operation regarding the phase, a jump in the phase is executed. In short, the difference in phase between the internal clock and the timing signal is cancelled by the jump in the phase of the internal clock.

The problem in the prior art pull-in technique is that an undesired transient response is produced for a while immediately after the execution of the jump in phase. The thus produced transient response has some inconveniences. First, it is difficult to increase the data transmission efficiency by shortening the timing signal duration. Such shortening is not, in actuality, possible due to the presence of the undesired transient response in the training signal duration, and therefore the duration is necessarily extended for a duration equal to that of the transient response. Second, in a case where the training signal duration is required to be shorter than a prescribed value currently used there is a possibility that the synchronous pull-in operation cannot be completed in the training signal duration due to the presence of the transient response.

SUMMARY OF THE INVENTION

Accordingly, an object of the present invention is to provide a synchronous pull-in process and circuit which can overcome the aforesaid problem, i.e., can minimize or substantially eliminate the transient response in the synchronous pull-in operation.

To attain the above object, the synchronous pull-in circuit according to the present invention operates to vary, at least, the tap coefficients of a transversal filter having a roll-off characteristic in accordance with a deviation in the phase between the timing signal and the internal clock.

BRIEF DESCRIPTION OF THE DRAWINGS

The above object and features of the present invention will be more apparent from the following description of the preferred embodiments with reference to the accompanying drawings, wherein:

FIGS. 4A, 4B, and 4C depict waveforms of signals and a phase jump appearing in FIG. 1, for explaining the transient response;

FIG. 12 displays data stored in a coefficient table ROM of FIG. 8 in relation with the decision outputs;

FIGS. 13A, 13B, and 13C depict waveforms of the signals and a phase jump;

FIGS. 14A, 14B, and 14C depict pulse trains and a schematic phase format for explaining a modified first embodiment according to the present invention;

FIG. 15 displays data stored in a tap coefficient ROM according to a modified first embodiment of the present invention;

FIG. 17 displays another type of tap coefficient table;

FIG. 20 schematically displays table data stored in the ROM of FIG. 19; and

DESCRIPTION OF THE PREFERRED EMBODIMENTS

Before describing the embodiments of the present invention, the prior art and the problems therein will be first described with reference to the related figures. Further, for ease of comprehension, the following explanations will be primarily made taking a MODEM receiver unit as an example.

Figure 1:
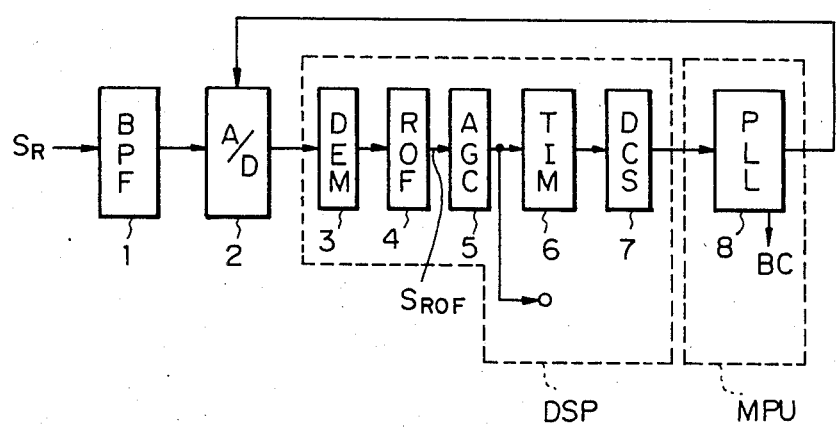
FIG. 1 is a block diagram of a receiver unit having a prior art synchronous pull-in circuit.

FIG. 1 is a block diagram of a receiver unit having a prior art synchronous pull-in circuit. In FIG. 1, a received signal $S_R$ given via a transmission line (not shown) is first applied to a bandpass filter (BPF) 1. The thus band-restricted signal is then applied to an analog/digital (A/D) converter, in which the received analog signal from the filter 1 is sampled at every period of a predetermined sampling clock and then converted into the corresponding digital signal. The digital signal is then input to a digital signal processor DSP. In the digital signal processor DSP, the output from the A/D converter 2 is demodulated by a demodulator (DEM)3 so as obtain the corresponding baseband signal. The baseband signal is given to a transversal filter 4 having a roll-off characteristic (hereinafter referred to simply as "roll-off filter ROF") by which the waveform of the baseband signal is transformed to an impulse response. The output from the roll-off filter 4 is subject to automatic gain control by an automatic gain control part (AGC) 5 and then given to a timing discriminator 6 from which a timing signal is extracted from the AGC'ed signal. The thus extracted timing signal is applied to a decision part (DCS) 7 in which it is decided whether the internal clock is leading or lagging in phase with respect to the thus extracted timing signal. It should be understood that the members 3 through 7 of FIG. 1 are preferably set up as a digital signal processor DSP. If so set up, the DSP executes various processes as schematically illustrated by blocks 3 through 7.

The above-mentioned decision part (DCS) 7 of FIG. 1 produces a decision output indicating lead or lag in the phase. The lead/lag decision output is input to a microprocessor MPU. The microprocessor MPU executes a process, among a variety of processes, which is equivalent to a phase-locked loop, as schematically illustrated by a phase-locked loop (PLL) part 8 in FIG. 1. The output of the PLL part 8 is adjusted in accordance with the lead/lag decision output, so that the output, i.e., the baud rate clock, of the PLL part 8 is controlled to synchronize the baud rate clock in phase with the timing signal contained, as a clock, in the received signal $S_R$. The thus adjusted baud rate clock is used, in the related receiver unit, as the basic, internal clock, so that the receiver unit is synchronized, as a whole, with the timing signal which is contained, as a clock, in the received signal. The above-mentioned synchronous pull-in operation is more clarified below.

Figure 2:
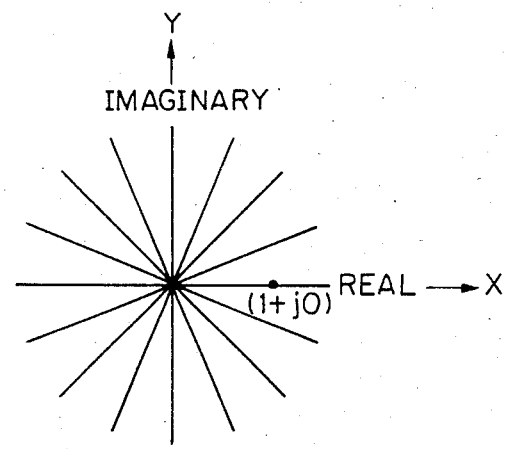
FIG. 2 is a vector expression of the phase for explaining the decision part of FIG. 1.
Figures 3A, 3B, 3C:
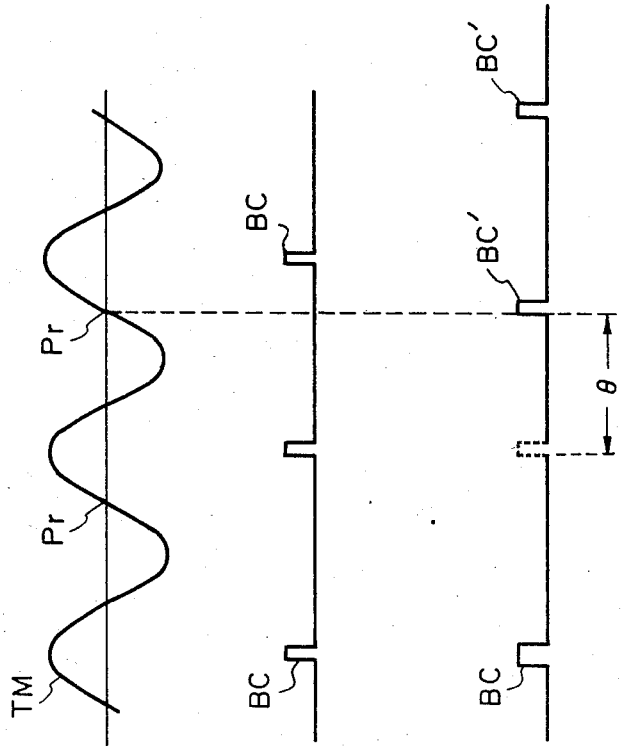
FIGS. 3A, 3B, and 3C depict waveforms of three signals appearing in FIG. 1.

FIG. 2 is a vector expression of the phase for explaining the decision part of FIG. 1. FIGS. 3A, 3B, and 3C depict waveforms of three signals TM, BC, and BC' appearing in FIG. 1. The waveform of FIG. 3A corresponds to the timing signal TM in the form of, for example, a sine wave. The waveform of FIG. 3B corresponds to the aforesaid baud rate clock BC. Each rising edge of baud rate clock BC must finally be synchronized with each rising point Pr of the timing signal TM. The baud rate clock BC is shifted in phase by $\theta$, as shown in FIG. 3C, which depicts the thus shifted baud rate clock BC'. That is, the phase of the initial clock BC is lagged by $\theta$ to obtain the clock BC'. The lag by $\theta$ is performed by a phase jump by means of the PLL part 8 (FIG. 1), which is controlled by the aforesaid lead/lag output from the decision part 7. It should be noted that it is also possible to obtain the shifted clock BC' through a lead in phase of the clock BC with respect to the phase of the timing signal TM. Thus, synchronous pull-in of the baud rate clock BC relative to the timing signal TM is performed. It should be understood that the apostrophe "'" is added, in FIG. 3A, to the characters BC only for facilitating understanding of the pull-in operation. Hereinafter, the baud rate clock will be referenced simply by the characters "BC."

The aforesaid sampling clock for the A/D converter 2 is generated from the baud rate clock BC such that the frequency of the sampling clock is n times the frequency of the clock BC. The number n is, for example, 4. Thus, the A/D converter 2 can sample the received signal to produce the corresponding digital signal in synchronization with the timing signal which is contained, as a clock, in this received signal. For this, the decision part 7 operates to analyze the output from the timing discriminator 6 with the use of the vector expression of the phase shown in FIG. 2. The vector is expressed in terms of a complex notation, i.e., a real part X and an imaginary part Y. As seen from FIG. 2, the two-dimensional vector phase plane is divided into a plurality of phase planes, for example, 16 in this figure. That is, each divisional phase plane defines 22.5° (=369°/16). When the sampling clock (identical to the baud rate clock BC) is synchronized in phase with the timing signal TM, the output of the timing discriminator 6 (FIG. 1) indicates a point represented by $(1 + j0)$ on the vector phase plane of FIG. 2, where j denotes an imaginary unit. Conversely, if the clock BC is not in phase with the timing sinal TM, the related output does not indicate the point $(1 + j0)$.

The above-mentioned vector phase plane is analyzed by the decision part 7 to detect at which divisional phase plane the timing signal TM from the timing discriminator 6 is now positioned. In accordance with the thus detected phase, the decision part 7 supplies, to the PLL part 8, a command for executing the jump in the phase by 22.5° xm (the number m is selected from 0 through 15), so that the phase jump by $\theta$ (corresponding to 22.5° xm) is executed for the baud rate clock BC. Thereby, the sampling clock for the A/D converter 2 is synchronized in phase with the timing signal TM contained, as a clock, in the received signal. It should be noted that the phase jump is performed only in the duration of the training signal. During usual data transmission after the training signal duration, the PLL part 8 operates to carry out fine adjustment of the frequency in response to the lead/lag decision output given from the decision part 7.

As mentioned above, according to the prior art technique, an instantaneous synchronous pull-in operation is achieved by a phase jump performed by the PLL part 8. Accordingly, the sampling clock to be applied to the A/D converter 2, is also instantaneously changed in phase. The sudden change in the phase necessarily creates an undesired transient response in the roll-off filter 4.

FIGS. 4A, 4B, and 4C depict waveforms of the signals $S_R$ and $S_{ROF}$ and a phase jump PJ appearing in FIG. 1 for explaining the transient response. The waveform of FIG. 4A corresponds to the received signal $S_R$, which has, at its head part, the training signal $S_{TR}$. The training signal $S_{TR}$ is shifted in phase with the phase jump of $\theta$ for the pull-in operation. This is schematically illustrated by a change in status as a phase jump PJ in FIG. 4B, whereby the training signal $S_{TR}$ is changed in phase from $\theta_1$ to $\theta_2$ suddenly due to the change in the phase of the clock BC. Thus, the pull-in operation is achieved. Thereafter, however, an undesired transient response is induced in the output $S_{ROF}$ from the roll-off filter 4, which transient response is represented by TRES in FIG. 4C. In this case, the training data contained in the signal $S_{TR}$ during the transient response TRES is not available. That is, the training data received during the response TRES cannot be used for the pull-in operations for equalization (EQL), automatic gain control (AGC), and carrier automatic phase control (CAPC). Accordingly, in the prior art, the pull-in operations for EQL, AGC, and CAPC must wait until the response TRES ends. The duration of the response TRES is generally as long as 3 to 5 ms.

Therefore, it is impossible to attain highly efficient data transmission through shortening the training signal duration. To be specific, when it is required to shorten the term of the synchronous pull-in operation in the receiver unit, the existence of the response TRES acts as an impediment. The term of the synchronous pull-in operation is generally defined by the duration between the RS time and CS time, where RS denotes a "request-to-send" given from a transmitter side and CS a "clear-to-send" dispatched from a receiver side. The RS-CS time corresponds to the aforesaid training signal duration. Thus, the transient response TRES cannot be disregarded for the MODEM training. Thus, in the worst case, the receiver unit may fail in the synchronous pull-in operation. This can easily happen in a data transmission system set up with very poor quality transmission lines.

According to the present invention, the above-mentioned undesired transient response TRES can be minimized or substantially eliminated.

Figure 5A:
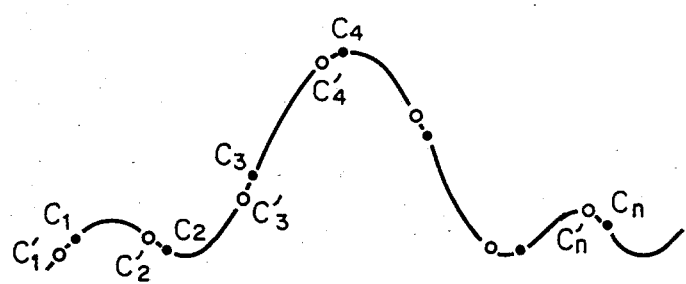
FIGS. 5A and 5B depict waveforms of signals for explaining the roll-off filter according to the present invention.
Figure 5B:
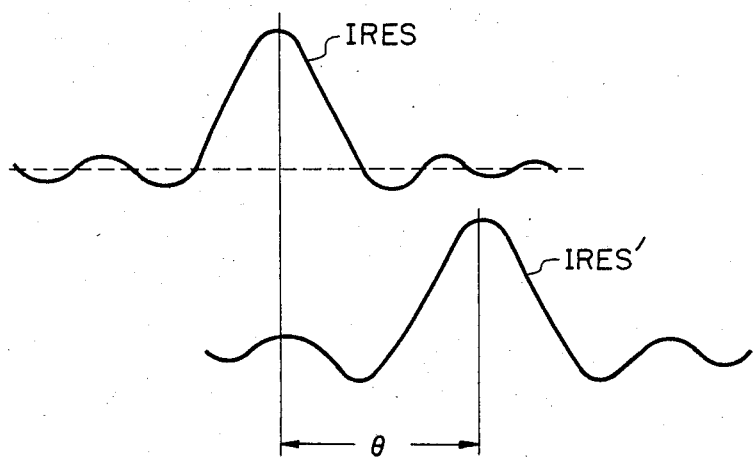

FIGS. 5A and 5B depict waveforms of signals for explaining the roll-off filter according to the present invention. The basic feature of the present invention is that the phase of the timing signal TM is synchronized with that of the internal clock (baud rate clock). Remember that, in the prior art, the phase of the internal clock (baud rate clock) is conversely synchronized with that of the timing signal TM. That is, in FIG. 1, the phase of the timing signal appearing at the input stage of the receiver unit is left as is, while the phase of the sampling clock at the A/D converter 2 is changed by the phase jump, whereby the phase of the training signal is seemingly changed, causing the transient response in the roll-off filter 4. Conversely, in the present invention, a phase shift $\theta$ is applied to the received signal, i.e., the timing signal itself. This phase shift can be realized by varying the tap coefficients of the roll-off filter 4.

As commonly known, a roll-off filter is primarily used for receiving a phase modulation (PM) signal and producing an impulse response therefor. For this, the roll-off filter is set up, based on the Nyquist theory, with: multistage series-connected delay circuits; a plurality of multipliers for multiplying filter coefficients, i.e., tap coefficients, with each output from respective delay circuits; and an adder which operates to add all the outputs from the multipliers. The output from the roll-off filter exhibits a characteristic including a plurality of zero cross points (refer to the cross points between the curve and the broken line (zero level) shown in FIG. 5B) distributed with a Nyquist interval. Thus the roll-off filter functions as a low pass filter to produce an impulse response having a cosine roll-off characteristic. The FIGURE of the roll-off characteristic is specified by the tap coefficients $C_1$ through $C_n$. When the tap coefficients $C_1$ through $C_n$ are changed respectively, to the tap coefficients $C_1'$ through $C_n'$, as shown in FIG. 5A, the roll-off curve is shifted as a whole. In the case where the tap coefficients $C_1'$ through $C_n'$ are determined to produce the aforesaid phase shift $\theta$ (refer to FIGS. 3C and 4B), an impulse response curve IRES is shifted, as a whole, by the phase shift $\theta$ to be an impulse response curve IRES', as illustrated in FIG. 5B. Thus, the phase of the output $S_{ROF}$ from the roll-off filter can be varied by varying the tap coefficients.

The present invention is based on the above-mentioned nature of the roll-off filter. The phase of the received signal can be varied to align the timing signal with the baud rate clock. Consequently, the synchronous pull-in operation is not achieved by varying the phase of the sampling signal for sampling the received signal at the A/D converter, as in the prior art. This means that no phase jump is performed in the receiver unit as in the prior art. Accordingly, no transient response is produced from the roll-off filter in the present invention.

Figure 6:
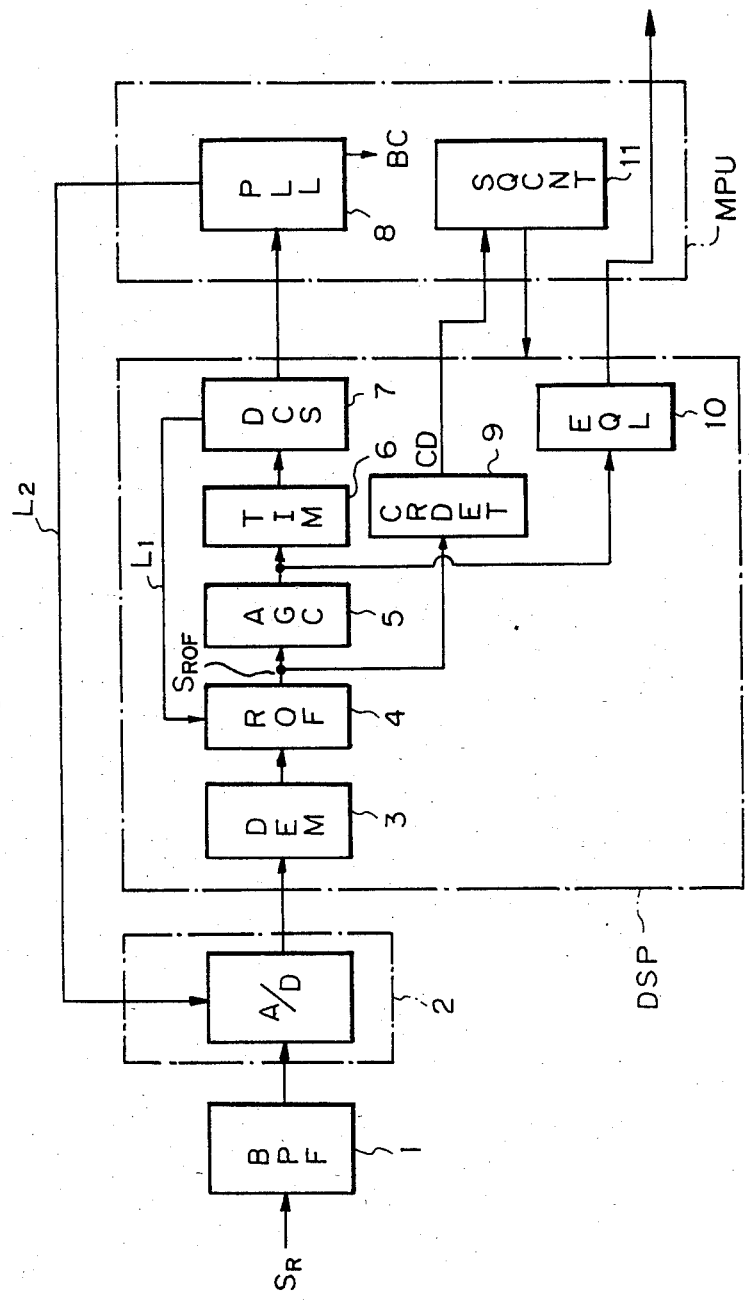
FIG. 6 is a block diagram of a receiver unit having a synchronous pull-in circuit according to a first embodiment of the present invention.

FIG. 6 is a block diagram of a receiver unit having a synchronous pull-in circuit according to a first embodiment of the present invention. In FIG. 6, members identical to those of previous figures are represented by the same reference numerals or characters (same for later figures). Reference numeral 9 represents a carrier detector (CRDET) which detects a carrier from the received signal $S_R$ supplied via the members 1, 2, 3, and 4 and then produces a carrier detection signal CD every time the received signal $S_R$ is actually given to the receiver unit. Reference numeral 10 represents the aforesaid automatic equalizer (EQL), which is preferably fabricated in the form of a transversal type equalizer to perform automatic equalization. Reference numeral 11 represents a sequence controller (SQCNT), which controls the overall sequence of various processes performed in the receiver unit. The sequence controller 11 can be fabricated basically with both a counter and a read-only memory (ROM). The counter is incremented one by one by a symbol rate clock. The thus incremented outputs are sequentially given, as memory addresses, to the ROM for accessing stored data therein, which data specifies each process to be started. It should be understood that the members 3 through 7, 9 and 10 of FIG. 6 are preferably set up as a digital signal processor DSP. If set up so, the processor DSP executes various processes as schematically illustrated by blocks 3 through 7, 9, and 10. Similarly the members 8 and 11 are preferably set up as a microprocessor MSP. If set up so, the microprocessor MSP executes the processes as schematically illustrated by blocks 8 and 11. In this case, various processes are carried out by the execution of programs set up in advance.

Particular attention should be paid, in FIG. 6, to a first control line $L_1$ spanning from the decision part 7 to the roll-off filter 4. A line similar to the line $L_1$ of FIG. 6 is not found in FIG. 1. The point is that the roll-off filter 4 is controlled by the output from the decision part 7 via the line $L_1$.

The operation is as follows. First, the training signal is given, as the received signal $S_R$, from the transmitter side to the receiver unit at its input side via the transmission line (not shown). The received signal is applied to the bandpass filter 1 so as to obtain a band-restricted signal from the received signal. The output from the filter 1 is transformed into a digital signal by the A/D converter 2. The digital signal is demodulated by the demodulator 3 to obtain a baseband signal. The impulse response for the baseband signal is produced by means of the roll-off filter 4, and thus the output $S_{ROF}$ is obtained. In response to the output $S_{ROF}$, the carrier detector 9 determines if the transmitter side starts transmission of data.

At the same time, the output $S_{ROF}$ is subjected to automatic gain control at the automatic gain control (AGC) part 5. Then, the AGC'ed signal is supplied to the timing discriminator 6 to extract the timing signal. The thus extracted timing signal is supplied to the decision part 7 to determine the phase thereof under a decision method explained hereinafter. In accordance with the resultant decision by the decision part 7, the corresponding tap coefficients are given to the roll-off filter 4 via the line $L_1$. With the given tap coefficients, the phase of the received signal is varied so as to coincide with the phase of the baud rate clock, whereby the synchronous pull-in operation for the received signal now given is completed.

During the pull-in operation, no transient response TRES (FIG. 4C) occurs and, therefore, the thus synchronized training signal starts being used immediately after the pull-in operation, for the pull-in operations performed in the automatic equalizer (EQL) 10, the automatic gain control part (AGC) 5, and the carrier automatic phase control part (CAPC) (not illustrated in FIG. 6, but usually located after the equalizer (EQL) 10). A variety of these pull-in operations are sequentially achieved by means of the sequence controller 11. Following the training signal, the received signal supplies an inherent data signal (refer to DT in FIG. 4A), which data signal is input to the automatic equalizer 10. Then, a logic "1" or "0" of the data signal is discriminated as usual with the aid of the microprocessor MPU. During the inherent processing of the data signal after the training signal, the decision part 7 continues controlling the PLL part 8 so that the PLL part 8 operates to carry out fine adjustment of the frequency, via a second control line $L_2$, for the A/D converter 2, in response to the lead/lag output given from the decision part 7 according to the timing signal contained, as a clock, in the data signal of the received signal.

Figure 7:
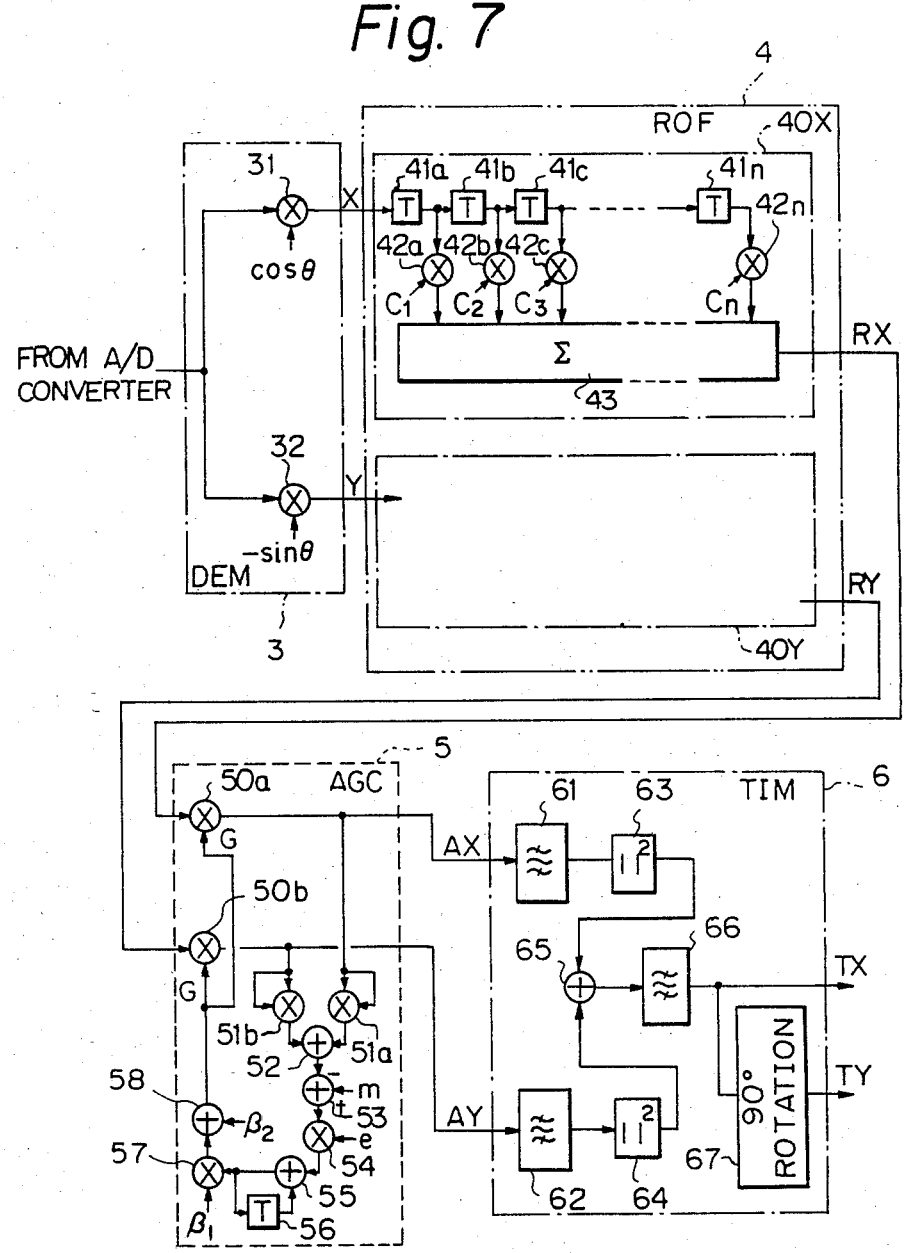
FIG. 7 is a detailed equivalent circuit diagram of a demodulator, roll-off filter, automatic gain control part, and timing discriminator shown in FIG. 6.
Figure 8:
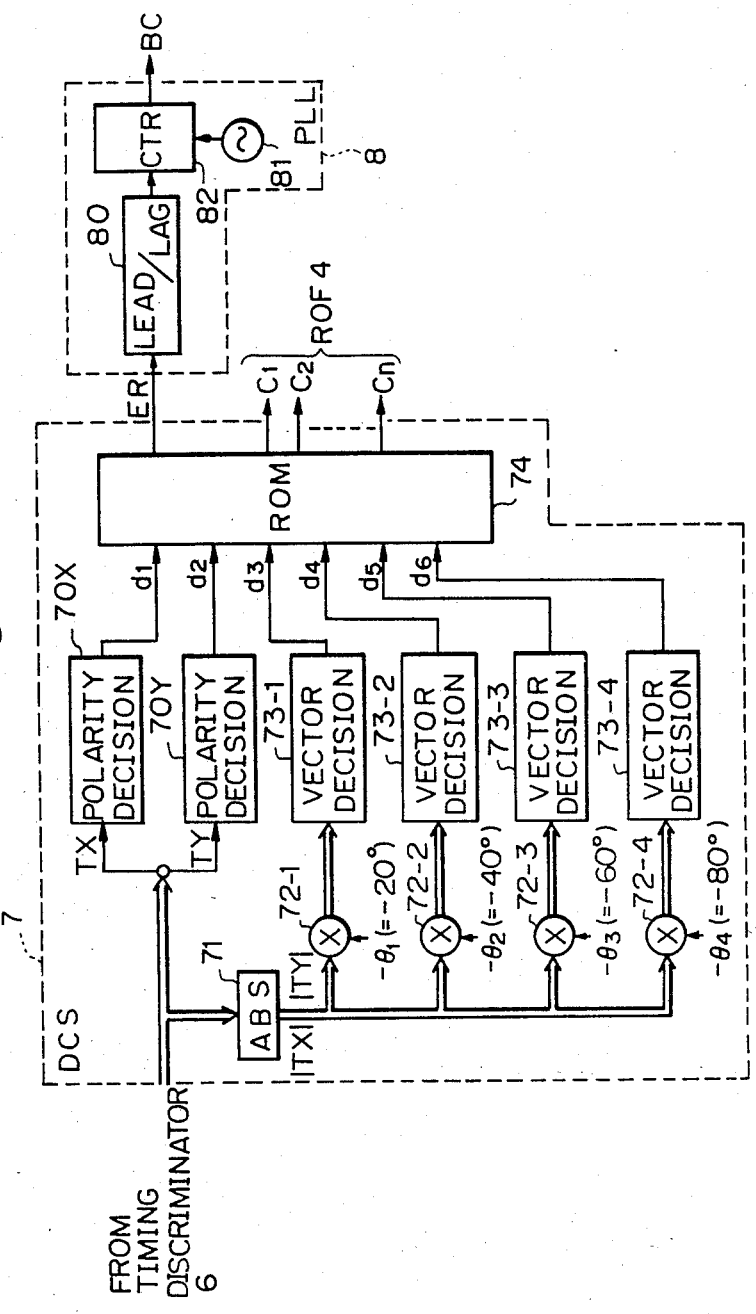
FIG. 8 is a detailed equivalent circuit diagram of a decision part and PLL part shown in FIG. 6.

FIG. 7 is a detailed equivalent circuit diagram of the demodulator, the roll-off filter, the automatic gain control part, and the timing discriminator shown in FIG. 6. FIG. 8 is a detailed equivalent circuit diagram of the decision part and the PLL part shown in FIG. 6. In FIG. 7, reference numerals 31 and 32 represent multipliers. The digital signal from the A/D converter 2 (FIG. 6) is digitally demodulated with, on one hand, the $\cos \theta$ component of the carrier at the multiplier 31 and, on the other hand, the $-\sin \theta$ component of the carrier at the multiplier 32, so as to obtain a real side baseband signal X and an imaginary side baseband signal Y, respectively. The $\cos \theta$ component carrier and the $-\sin \theta$ component carrier are preferably given from a ROM (not shown), which stores therein data for generating a carrier wave of the $\cos \theta$ component and a carrier wave of the $-\sin \theta$ component. The real and imaginary side baseband signals X and Y are applied to the roll-off filter (ROF) 4. The filter 4 is composed of both a real (X) side roll-off filter 40X and an imaginary (Y) side roll-off filter 40Y. The roll-off filters 40X and 40Y have the same structure. Therefore, details of the filter 40Y are omitted in FIG. 7. The real side roll-off filter 40X (same for the filter 40Y) comprises: n stage delay circuits (T: tap) 41a through 41n; multipliers 42a through 42n for multiplying the outputs from respective delay circuits 41a through 41n by corresponding tap coefficients $C_1$ through $C_n$; and an adder 43 for adding all the outputs from the multipliers 52a through 52n. It is important to note here that, according to the present invention, the tap coefficients $C_1$ through $C_n$ are variable under control by the decision part 7 via the line $L_1$ (refer to FIG. 6).

Looking next at the AGC part 5 of FIG. 7, reference numerals 50a and 50b represent multipliers. The multipliers 50a and 50b multiply the real (X) side and imaginary (Y) side filtered outputs RX and RY from the filters 40X and 40Y, respectively by a gain G, so that the magnitude of each of the filtered outputs RX and RY is always kept at predetermined constant level in cooperation with other multipliers 51a, 51b, 54, and 57, adders 52, 53, 55, and a tap 56. Each of the multipliers 51a and 51b functions to square each of the outputs RX and RY. the thus squared outputs are added to each other at the adder 52 so as to obtain the power of the filtered output as a whole. The power in terms of voltage is subtracted by a reference voltage m at the adder 53. The output from the adder 53 is multiplied by n at the multiplier 54, where the character e indicates a feedback coefficient with which the amount for feedback, i.e., an error amount, is determined such that the feedback amount is regulated to be a suitable amount. The thus produced error amount is integrated by an integrator which is formed with both the adder 55 and the tap 56. The thus integrated error amount is adjusted to the optimum magnitude level as the gain G with the use of predetermined coefficients $\beta_1$ and $\beta_2$ at the multiplier 57 and the adder 58. Since the AGC part 5 itself is well known, a further explanation will be omitted.

Looking next at the timing discriminator (TIM) 6 of FIG. 7, the discriminator 6 has, at its input, a real (X) side timing extraction filter 61 and an imaginary (Y) side timing extraction filter 62, both constructed as bandpass filters. Each of the filters 61 and 62 receives a real (X) side AGC'ed output AX and an imaginary (Y) side AGC'ed output AY, respectively, wherein each filter functions to extract only the frequency component from the individual AGC'ed output selectively, which frequency component is useful for generating the timing signal. The frequency components from the filters 61 and 62 are applied to square circuits 63 and 64, respectively, which square circuits 63 and 64 produce the powers of the real side and imaginary side frequency components, respectively. The thus produced powers are added to each other at an adder 65 so as to obtain a resultant power having a level irrespective of a carrier phase. The resultant power is then filtered by a bandpass filter 66 so as to filter out undesired DC components and AC components other than the frequency component for generating the timing signal. As a result, a real (X) side timing component TX is output from the filter 66. An imaginary (Y) side timing component TY is generated by rotating the phase of the real side timing component TX by 90° at a phase rotation part (90° ROTATION) 67. The operation of the phase rotation, part 67 is preferably done through digital calculation. For example, when six samplings are made in every period of the timing signal at the A/D converter 2, for the received signal, both $\cos \theta$, as the component TX per se, and $\cos(\theta + \pi/3)$ are given for the related digital calculation, where the phase $\pi/3$ is derived from $2\pi/6$ (6 corresponds to the number of samplings). During the digital calculation, the term $\cos(\theta + \pi/3)$ is expanded to be $\cos \theta \cdot \cos \pi/3 - \sin \theta \cdot \sin \pi/3$. Thus, $\cos(\theta + \pi/3) = \cos \theta \cdot \cos \pi/3 - \sin \theta \cdot \sin \pi/3$ stands. From the above expression, $$\sin\theta = \frac{\cos\theta \cdot \cos\frac{\pi}{3} - \cos\left(\theta + \frac{\pi}{3}\right)}{\sin\frac{\pi}{3}}$$

is derived. The $\cos \theta$ corresponds to the real side component TX, and, therefore, the $\sin \theta$ represents the imaginary side component TY.

Referring to FIG. 8, in the decision part (DCS) 7, reference numerals 70X and 70Y represent polarity decision parts which receive the real side and imaginary side timing components TX and TY, respectively, to discriminate each polarity separately. On the other hand, the real side and imaginary side timing components TX and TY are both applied to an absolute value generator (ABS) 71, which produces therefrom an absolute value of the timing component TX and also an absolute value of the timing component TY separately. Each of the polarity decision parts 70X and 70Y can be realized simply as a most significant bit (MSB) detector, since, usually, the MSB of a digital code has the sign of the related digital data. Thus, the outputs from the polarity decision parts 70X and 70Y determine in which one of the four quadrants the timing signal concerned is positioned on the vector phase plane. If the decision parts 70X and 70Y indicate the polarities (+,+), (−,+), (−,−) and (+,−), it is concluded that the phase of the timing signal is positioned in the first, second, third, and fourth quadrants, respectively. The absolute value generator 71 is employed for concentrating the phase data existing in four quadrants (I, II, III, IV) into the phase data existing in the first quadrant I on the vector phase plane for easy phase discrimination.

The real side and imaginary side timing components (|TX|, |TY|), expressed as absolute values, are input to multipliers 72-1 through 72-4 simultaneously. These multipliers 72-1 through 72-4 multiply the absolute values |TX| and |TY| by $-\theta_1$, $-\theta_2$, $-\theta_3$, and $-\theta_4$, respectively, which are, for example $-20°$, $-40°$, $-60°$, and $-80°$, respectively, whereby four kinds of phases rotated by these four phase angles with respect to the values |TX| and |TY| are obtained at one time. These four rotated phases are given to respective vector decision parts 73-1, 73-2, 73-3, and 73-4. The vector decision part 73-1 discriminates whether or not the phase angle defined with both the $-\theta_1$ rotated phases |TX| and |TY| is smaller then 10°. Similarly, the vector decision parts 73-2 through 73-4 discriminate whether or not the individual $-\theta_2$, $-\theta_3$, and $-\theta_4$ rotated phase angles are smaller than 10°. The meaning of the discrimination will be clarified below.

Figure 9:
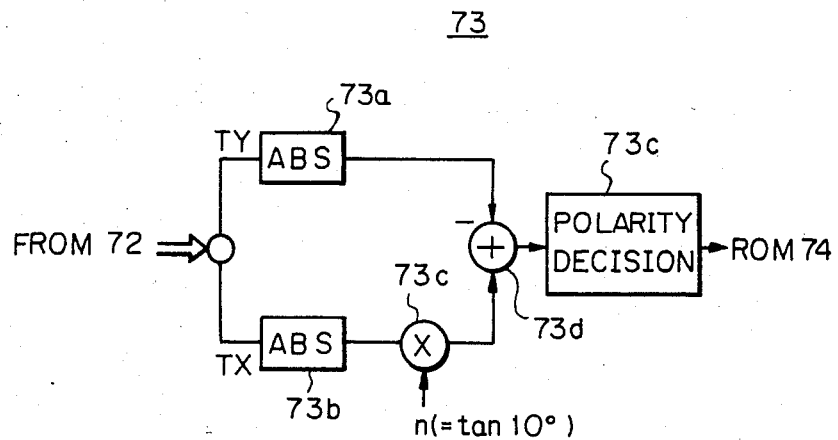
FIG. 9 is a detailed equivalent circuit diagram of each of the vector decision parts shown in FIG. 8.

FIG. 9 is a detailed equivalent circuit diagram of the vector decision parts shown in FIG. 8. In FIG. 9, each of the vector decision parts 73 in FIG. 8 comprises: an imaginary (Y) side absolute value generator (ABS) 73a, which produces an absolute value of the imaginary side timing component TY given from the corresponding multiplier (72 of FIG. 8); a real (X) side absolute value generator (ABS) 73b, which produces an absolute value of the real side timing component TX given from the corresponding multiplier (72 of FIG. 8); a multiplier 73c, which multiplies the absolute value timing component TX by n, where n equals tan 10°; an adder 73d, which operates to subtract the value from the multiplier 73c by the value from the generator 73a; and a polarity decision part 73e which discriminates the polarity of the output from the adder 73d and applies the resultant polarity to a ROM 74 (shown in FIG. 8).

Returning to FIG. 8, the ROM 74 holds therein a coefficient table. That is, the ROM 74 is supplied with, as its address, various data $d_1$, $d_2$, $d_3$, $d_4$, $d_5$, and $d_6$ produced from the previously explained members 70X, 70Y, 73-1 through 73-4, respectively, and produces therefrom an error signal ER and variety of tap coefficients $C_1$ through $C_n$. These values ER and $C_1$ through $C_n$ are predetermined and stored in the ROM 74 in the form of a table. The error signal ER is applied to the PLL part 8, while the tap coefficients $C_1$ through $C_n$ are applied to the roll-off filter 4.

In the above-mentioned PLL part 8 of FIG. 8, the error signal ER is first input to a lead/lag controller 80, which cooperates with a counter (CTR) 82. The counter 82 is operable by the controller 80 to count the individual clocks given from a clock source 81 incrementally and decrementally, in accordance with the content of the error signal ER, to perform lead control and lag control for the baud rate clock BC, respectively. In other words, the counter 82 functions as a frequency divider for the clock generated by the clock source 81, the dividing ratio of which frequency divider is determined by the lead/lag controller 80, whereby the synchronously pulled-in baud rate clock BC is generated.

Figure 10:
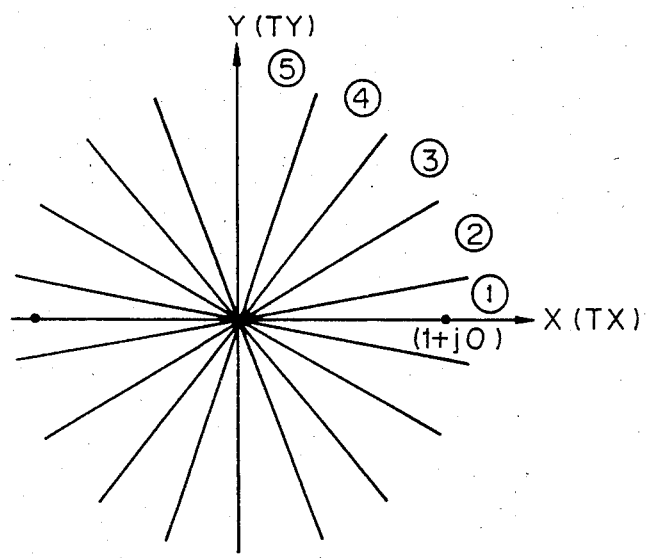
FIG. 10 depicts a vector phase plane used for determining the phase of the timing signal.

The operation of the synchronous pull-in circuit, disclosed in FIGS. 7, 8, and 9, will be more clarified with reference to the related figures. That is, FIG. 10 depicts a vector phase plane used for determining the phase of the timing signal.

Figure 11A:
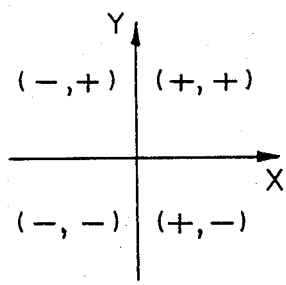
FIGS. 11A and 11B are views for explaining the operation for the decision of the phase.
Figure 11B:
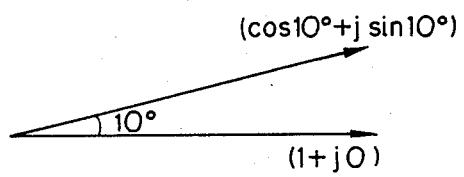

FIGS. 11A and 11B are views for explaining the operation for the decision of the phase. FIG. 12 displays data $C_1$ to $C_n$ stored in the coefficient table ROM of FIG. 8 in relation with the decision outputs. Referring first to FIG. 7, the demodulator 3 demodulates the digital output signal supplied from the A/D converter 2. That is, the digital output signal is multiplied by the $\cos \theta$ component and $-\sin \theta$ component of the carrier at the multipliers 31 and 32 to produce the real (X) side component X, i.e., real side baseband signal, and the imaginary (Y) side component Y, i.e., imaginary side baseband signal. These baseband signals X and Y are respectively given to the X-side roll-off filter 40X and the Y-side roll-off filter 40Y, so that the impulse responses with respect to the thus given baseband signals X and Y are produced therefrom. The impulse response with respect to the signal X is obtained by first multiplying, at the multipliers 42a through 42n, the outputs from the delay circuits 41a through 41n by tap coefficients $C_1$ through $C_n$ and summing the thus multiplied values at the adder 43, whereby the real side filtered output, i.e., the impulse response RX, is obtained. This is also true of the imaginary side impulse response RY. The above-mentioned filtering operation is simply expressed by $$RX = \sum_{k=a,b...}^{n} C_k Z_k$$

(the same applies for RY), where $C_k$ is each tap coefficient and $Z_k$ is the output from each delay circuit (51).

The filtered outputs RX and RY are input to the AGC part 5, in which a known AGC operation is performed to produce the AGC'ed outputs AX and AY. The outputs AX and AY are input to the timing discriminator 6 to produce the X-side and Y-side timing components TX and TY, as mentioned previously. These components TX and TY are applied to the decision part 7 illustrated in detail in FIG. 8. The decision part 7 is operative to detect at which angle the phase, defined by both TX and TY, is positioned on the vector phase plane of FIG. 10. In the example of FIG. 10, the phase plane is divided into 18 segments, and therefore each divided phase plane takes 20° in angle (20°×18=360°).

For the detection of the phase, it is discriminated first, in FIG. 11A, in which quadrant the phase to be detected is located, which phase is defined by the values TX and TY. As shown by FIG. 11A, in the first quadrant, the values TX and TY have, respectively the polarity pair + and +. In the second, third, and fourth quadrants, the values TX and TY have the polarity pairs (−,+), (−,−), and (+,−), respectively. To be specific, in FIG. 8, the polarities of the TX and TY are discriminated at the polarity decision parts 70X and 70Y and the resultant data $d_1$ and $d_2$ are input to the ROM 74. The data $d_1$ and $d_2$ specify the quadrant in which the phase to be detected exists.

Next, it is discriminated at which divisional phase plane the phase to be detected is positioned. Although the phase may exist in any of the four quadrants in actuality, the decision of the phase is achieved only in the first quadrant for ease of calculation. For this, the absolute values of the components TX and TY are generated by the absolute value generator 71 in FIG. 8, as mentioned previously. The absolute values are then input to the multipliers 72-1 through 72-4 of FIG. 8 and further to the vector decision part 73-1 through 73-4 of FIG. 8. The functions of these members 72-1 through 72-4 and 73-1 through 73-4 have already been explained, however, they will now be made clearer with reference to FIG. 10.

As mentioned above, the decision of the phase is achieved only in the field of the first quadrant which contains five divisional phase planes ①, ②, ③, ④, and ⑤. To be more specific, the decision of the phase is performed in the field of the divisional phase plane ①. For this, the multiplier 72-4 functions to shift the divisional phase plane ⑤ to the plane ① with the multiplying constant $-\theta_4(=-80°)$. Similarly, the multipliers 72-3, 72-2, and 72-1 function shift, respectively, the divisional phase planes ④, ③, and ② to the common plane ①. For example, the timing component positioned at the divisional phase plane ⑤ is rotated by an angle $-\theta_4(=-80°)$ to fall in the common plane ①. In this case, if the rotated phase of the timing component is found to be within the range of an angle smaller than 10° relative to the vector 1+j0, it can be determined that the related timing component is now positioned in the divisional phase plane ⑤, i.e., 80° through 90°.

It should be understood here that the reference vector 1+j0 is identical to the phase of the timing signal at which the timing signal is synchronized in phase with the internal clock, i.e., baud rate clock. Whether the rotated phase is within the range of angle smaller than 10° can be determined by means of the aforesaid vector decision parts 73-1 through 73-4 of FIG. 8, details of which are shown in FIG. 9. The phase angle 10° is expressed, in terms of complex notation, as $\cos 10° + j\sin 10°$, which corresponds to a vector shown in FIG. 11B. The ratio Y/X between the X and Y components of this vector can be expressed as $$Y/X = n \cdot \tan 10° \qquad (1)$$

In this regard, when the phase, defined by both the timing components TX and TY, is to have a phase angle $\theta$ smaller than 10°, the following condition (2) must be satisfied.

$$TY/TX \leq n \qquad (2)$$

That is, $$TX \cdot n - TY \leq 0 \qquad (3)$$

should stand. The above recited condition (3) is dealt with by the decision part 73 shown in FIG. 9.

Referring to FIG. 9, the absolute value TX from the generator 73b is multiplied, at the multiplier 73c, by n (=tan10°) to obtain TX·n, which corresponds to the first term of the above recited condition (3). The subtraction of TY from TX·n under the condition (3), i.e., TX n−TY, is carried out by means of the adder 73d. Whether the condition TX·n−TY≤0 stands or not is detected by means of the polarity decision part 73e. That is, the polarity decision part 73e determines that the phase to be detected falls in the range of angle smaller than 10° if the polarity decision part 73e determines that the resultant polarity by the adder 73d is positive (+).

The above-mentioned process is performed in each of the vector decision parts 73-1 through 73-4, parallely, with respective different phase rotations by $-\theta_1$, $-\theta_2$, $-\theta_3$, and $-\theta_4$, respectively, so that respective resultant data are obtained simultaneously, as referenced by $d_3$ through $d_6$, respectively. Each of the data has logic "1" or "0". For example, the data $d_3$, $d_4$, $d_5$, and $d_6$ assumes "0001". In this case, since the data bit $d_6$ from the part 73-4 indicates logic "1", the related data indicates that the phase of the timing signal deviates in angle by $-\theta_4$ relative to the phase of the baud rate clock BC.

The relationship between the phase deviation ($\theta$) and the data ($d_1$ through $d_6$), i.e., the decision output, is displayed, as an example, in FIG. 12. If the phase deviation $\theta$ is in a range, for example, from 70° to 90°, the decision output $d_1$ through $d_6$ displays a bit code of logic "000001". The bit code "000001" is applied, as an address, to the ROM 74 of FIG. 8. The ROM 74 holds therein a tap coefficient table regarding $C_1$ through $C_n$. Accordingly to the above example, the address "000001" is given to the ROM 74, and thereby the tap coefficient specifying 80° is read therefrom. In the example of FIG. 12, the top coefficient sets of $C_1$ through $C_n$ are prepared in such a manner that the timing signal of the received signal can be shifted, at the roll-off filter 4, in phase by every unit of 20°, such as 0°→20°→40°→60°... and so on. Thus, the jump in the phase is performed for the timing signal in the roll-off filter 4 with the amount of phase specified by the tap coefficients $C_1$ through $C_n$ in accordance with the phase deviation $\theta$ detected.

The processes for the above-mentioned phase decision are sequentially carried out under the control of the sequence controller (SQCNT) 11 shown in FIG. 6 and only during the reception of the training signal $S_{TR}$. FIGS. 13A, 13B, and 13C depict waveforms of the signals $S_R$ and CD and a phase jump PJ. First, the received signal $S_R$ appears at the input of the receiver unit as shown in FIG. 13A. Soon after this the carrier detection signal CD is produced from the carrier detector 9 of FIG. 6, as shown in FIG. 13B. In response to the carrier detection signal CD, the sequence controller 11 of FIG. 6 starts operating so as to begin the phase decision through the processes mentioned before. That is, the decision part 6 of FIGS. 6 and 7 starts the operation for the aforesaid phase decision, and thereby the optimum tap coefficients $C_1$ through $C_n$ are determined and loaded at respective multipliers in the roll-off filter 4, which are completed during a term $T_{DCS}$ (FIGS. 13B and 13C). By this, the characteristic in phase of the roll-off filter 4 is changed from the initial phase (0°) to synchronously pulled-in phase (n°), as shown in FIG. 13C. The thus determined optimum tap coefficients $C_1$ through $C_n$ are held as they are until the transmission of the data signal DT finishes, except for a usual fine adjustment of the frequency. The fine adjustment is achieved at the PLL part 8 of FIG. 8 according to the error signal ER, which is given based on the data $d_1$ and $d_2$. The data $d_1$ and $d_2$ are a part of the decision output as shown in FIG. 12. The error signal ER is used, via the lead/lag controller 80, for slightly varying the frequency dividing ratio to finely adjust the frequency of the baud rate clock BC.

As mentioned above, the basic concept of the present invention resides in that the timing signal is synchronized in phase with the baud rate clock by selecting optimum tap coefficients of the roll-off filter according to the phase deviation between the timing signal and the baud rate clock. In short, the received signal including the timing signal is lagged in phase.

The receiver unit having the synchronous pull-in circuit according to the first embodiment can be partially modified. The modification is directed to the ROM 74 of FIG. 8. According to the above-mentioned original first embodiment, the ROM 74 stores all the tap coefficient data for each divisional phase plane. Therefore, the ROM 74 is required to have a considerably large memory capacity. According to the modified first embodiment, the ROM can be of a small memory capacity. This will be clarified below.

FIGS. 14A, 14B, and 14C depict pulse trains and a schematic phase format for explaining a modified first embodiment according to the present invention. In the example, the baud rate clock BC shown in FIG. 14A is predetermined to be the frequency of 1.2 kHz, which corresponds to 2400 baud, and the sampling clock SC is predetermined to be the frequency of 7.2 kHz, whereby six (=7.2/1.2) samplings are achieved during every baud rate term T at the A/D converter 2 of FIG. 8. Since each baud rate term T is defined by 360°, each sampling is defined by 60°. Accordingly, each delay circuit (41) of the roll-off filter 4 has, in this case, a delay amount of T/6. The modified first embodiment is based on this fact, as clarified with reference to FIG. 15.

FIG. 15 displays data stored in the tap coefficient ROM according to a modified first embodiment of the present invention. Assuming that the tap coefficients $C_1$ through $C_n$, at the phase deviation $\theta=0$, are predetermined to be $a_1, a_2, a_3 \ldots a_n$, as shown in FIG. 15, the tap coefficients $C_1$ through $C_n$, at the phase deviation $\theta=60°$, are automatically obtained by moving the tap coefficients by one tap and allocating the same values $a_1, a_2, a_3 \ldots a_{n-1}$ to the thus moved tap coefficients $C_2$ through $C_n$, respectively, which movement of the tap is effected based on the above mentioned delay amount of T/6. This means that it is sufficient to prepare only the tap coefficients corresponding to the phase deviations $\theta=0°$, $\theta=20°$, and $\theta=30°$, such as "$a_1$ through $a_n$", "$b_1$ through $b_n$", and "$d_1$ through $d_n$", respectively, because other tap coefficients corresponding to, for example, the phase deviations $\theta=60°$, $\theta=120°$, $\theta=180°$ ... can be determined with the same tap coefficients prepared for the phase shift $\theta=0°$, but merely moving the tap position one by one. This is also true for both the case using the tap coefficients $b_1$ through $b_n$, of the phase deviations $\theta=20°$, 80°, 140° ... and the case, using the tap coefficients $d_1$ through $d_n$, of the phase deviations $\theta=40°$, 100°, 160°.... Thus, it is sufficient for the ROM 74 to hold the considerably small size tap coefficient data table containing only several kinds of tap coefficient data, such as $a_1$ through $a_n$, $b_1$ through $b_n$, and $d_1$ through $d_n$. However, the ROM must cooperate with additional circuits for realizing the movement of the tap position when a phase deviation $\theta$, other than the reference phase deviations $\theta=0°$, $\theta=20°$ and $\theta=40°$, is specified. The 35 additional circuits for the movement of the tap position will be disclosed below.

Figure 16:
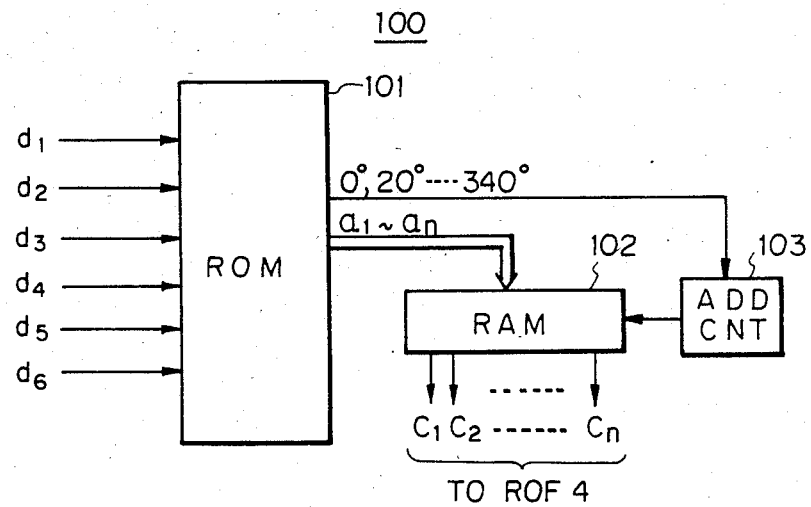
FIG. 16 is a circuit diagram of a tap coefficient supplier according to a modified first embodiment of the present invention.

FIG. 16 is a circuit diagram of a tap coefficient supplier according to a modified first embodiment of the present invention. It should be understood that the major parts of the receiver unit are the same as those of the original first embodiment shown in FIGS. 6, 7, 8, and 9, therefore need not be recited again. The difference here is that the ROM 74 of FIG. 8 is replaced by the tap coefficient supplier 100. The tap coefficient supplier 100 is comprised of a ROM 101, a random-access memory (RAM) 102, and an address controller (ADD CNT) 103. The ROM 101 is accessed by, as an address, the data $d_1$ through $d_6$, as is the ROM 74 of FIG. 8. The afore-mentioned additional circuits are formed with the RAM 102 and the address controller 103. The ROM 101 is composed of two regions. The first region receives the data $d_1$ through $d_6$, as an address and produces the corresponding phase deviation $\theta$, such as 0°, 20°, 40°..., selectively. At the same time, the second region receives the same address and produces the corresponding tap coefficients, such as "$a_1$ through $a_n$", "$b_1$ through $b_n$", or "$d_1$ through $d_n$", selectively. Assuming that the data $d_1$ through $d_6$ specifies the phase deviation $\theta=0°$, the corresponding tap coefficients $a_1$ through $a_n$ are loaded in the RAM 102. In this case, the address controller 103 accesses the RAM 102 to produce the corresponding tap coefficients $a_1$ through $a_n$ as the tap coefficient outputs $C_1, C_2 \ldots C_n$ to be input to the roll-off filter 4 of FIG. 7. In another case, assuming that the data $d_1$ through $d_6$ specifies the phase deviation $\theta = 60°$, the corresponding tap coefficients $a_1$ through $a_n$ are loaded in the RAM 102, as in the above case. However, in the present case, the address controller 103 accesses the RAM 102 to produce the corresponding tap coefficients $a_1$ through $a_{n-1}$ as the tap coefficient outputs $C_2 \ldots C_n$, according to the table of FIG. 15, wherein the tap coefficient $C_1$ is null. If the data $d_1$ through $d_6$ specifies the phase deviation $\theta = 80°$, the tap coefficients $b_1$ through $b_n$ are loaded from the ROM 101 to the RAM 102. However, in this case, the address controller 103 gives an address to the RAM 102 to produce the tap coefficients $b_1$ through $b_{n-1}$, as the outputs $C_2 \ldots C_n$. A similar operation is performed for the individual phase deviation $\theta$.

As mentioned above, according to the modified first embodiment of the present invention, the ROM 101 of FIG. 16 can be of a smaller capacity than the ROM 74 of FIG. 8 due to the use of the tap coefficient table displayed in FIG. 15. It is also possible to use another tap coefficient table to attain this reduction of memory capacity.

FIG. 17 displays another tap coefficient table. The table data, i.e., one row of the tap coefficients, is stored in the ROM 101 of FIG. 16 and read under control of the RAM 102 and the address controller 103. Assuming that there are, in FIG. 7, 15 delay circuits (taps), 21 (=15 +6: refer to 6 of FIG. 14C) tap coefficients $C_1$ through $C_{21}$ are predetermined and stored in the ROM 101. The 21 tap coefficients are commonly used for each of the phase deviations $\theta = 0°$, $\theta = 60°$, $\theta = 120°$ ... $\theta = 300°$, by moving the tap position by a respective number of taps. Thus, data having the marks X represent nonused data. Such movement of the taps is achieved under control of the RAM 102 and the address controller 103. It should be noted that another two sets of tap coefficients used by the first phase deviations $\theta$, i.e., 20°, 80°, 140° ... 320°, and the second phase deviations $\theta$, i.e., 60°, 120°, 180° ... 340°, are also predetermined and stored in the ROM 101.

The receiver unit having the synchronous pull-in circuit according to the first embodiment may be further modified. The modification is directed to the roll-off filter 4. According to the further modified embodiment, the filtering characteristic of the roll-off filter can be more improved in the signal-to-noise (SN) ratio. To be specific, so-called quantizing noise can be suppressed with the modified embodiment.

Figure 18A:
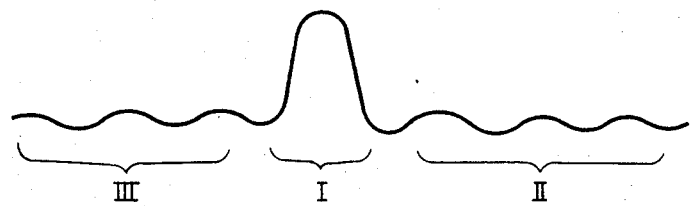
FIG. 18A depicts a waveform of the output from a conventional roll-off filter.

FIG. 18A depicts a waveform of the output from a conventional roll-off filter. The waveform, i.e., the impulse response, is also illustrated previously in FIGS. 5A and 5B.

Figure 18B:
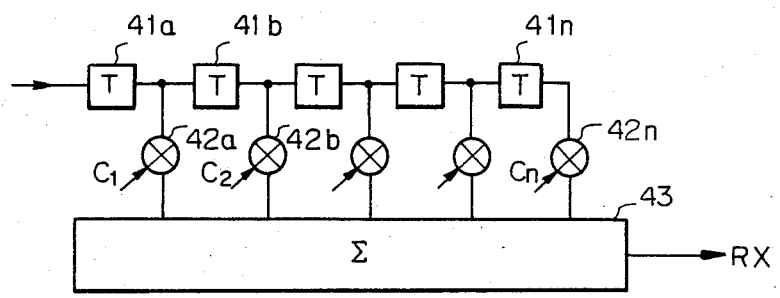
FIG. 18B is an equivalent circuit diagram of a conventional roll-off filter to produce the impulse response shown in FIG. 18A.
Figure 18C:
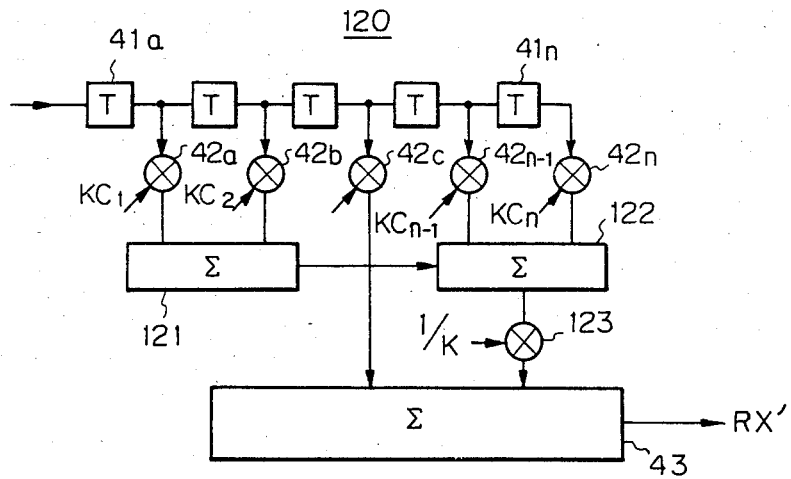
FIG. 18C is an equivalent circuit diagram of a roll-off filter according to a further modified embodiment of the present invention.

FIG. 18B is an equivalent circuit diagram of a conventional roll-off filter producing the impulse response shown in FIG. 18A. FIG. 18C is an equivalent circuit diagram of a roll-off filter according to a further modified embodiment of the present invention. The roll-off filter of FIG. 18B is the same as that shown in FIG. 7. The taps, i.e., the delay circuits $41a$ through $41n$ of FIG. 18B work to form respective parts of the waveform illustrated at portions in FIG. 18A located just above the respective taps with respective tap coefficients $C_1$, $C_2 \ldots C_n$.

The waveform of FIG. 18A is divided into three regions I, II and III, for ease of explanation. Region I represents the center side portion created with a large tap coefficient, while regions II and III represent other side portions created with small tap coefficients. It is apparent from FIG. 18A that the quantizing noise produced from each of the other side portions II and III is larger than that produced from the center side portion I. Taking this fact into consideration, according to the modified first embodiment, K times the tap coefficients are used for the taps pertaining to the regions II and III producing the large quantizing noise, where K is a predetermined positive integer larger than 1. The thus multiplied outputs by K given from the rear side multipliers, such as $42a$, $42b$, are supplied to a rear side adder ($\Sigma$) 121. Similarly the thus multiplied outputs by K given from the front side multipliers, such as $42_{n-1}$, $42_n$ given from the front side multipliers, such as $42_{n-1}$, $42_n$ are supplied to a front side adder ($\Sigma$) 122. At this time, the added result from the adder 121 is also added to the added result of the outputs from the front side multipliers. On the other hand, the output from the center side delay circuit is multiplied by an ordinary tap coefficient at the center side multiplier $42c$, as usual, without using the multiplying constant K, and directly input to the adder 43, as usual. The adder 43 receives the output from the front side adder 122 via a multiplier 123 having an inversed multiplying constant, i.e., $1/K$. By this, the adder 43 can receive the outputs from the rear and front side multipliers having the usual level. According to the nature of the filter, there is a remarkable difference in filtering effect between the noise and the signal. Therefore, the roll-off filter 120 of FIG. 18C is improved in its SN ratio by multiplying each noisy output by K selectively and restoring the thus multiplied outputs by $1/K$. It should be understood that the inherent filtering characteristic of a roll-off filter is not adversely affected by such mathematical operations as mentioned above.

A receiver unit having a synchronous pull-in circuit according to a second embodiment of the present invention will be described below. The difference between the first and second embodiments is that the second embodiment utilizes not only the phase shift in the roll-off filter 4 as in the first embodiment, but also a phase jump for the baud rate clock, so as to perform the synchronous pull-in operation.

Figure 19:
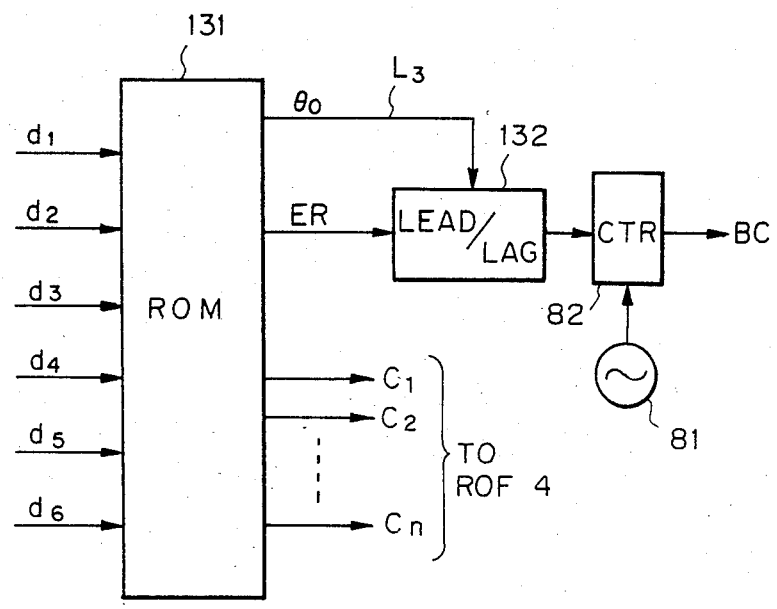
FIG. 19 is a circuit diagram of a tap coefficient and phase jump command generator according to a second embodiment of the present invention.

FIG. 19 is a circuit diagram of a tap coefficient and phase jump command generator according to a second embodiment of the present invention. The tap coefficient and phase jump command generator 130 correspond to the tap coefficient supplier 100 shown in FIG. 16 according to the modified first embodiment and basically to a part of the decision part 7 shown in FIGS. 6 and 8. It should be understood that the major parts of the receiver unit according to the second embodiment are the same as those of the first embodiment shown in FIGS. 6, 7, 8, and 9, therefore need not be recited again. The difference here is that the ROM 74 and the lead/lag controller 80 of FIG. 8 are replaced by the generator 130. As seen from FIG. 19, the generator 130 is comprised of a ROM 131 and a lead/lag controller 132. Attention should be paid to a line $L_3$, which delivers information regarding a phase jump angle $\theta_0$ given from the ROM 131.

FIG. 20 schematically displays table data stored in the ROM of FIG. 19. The center column C displays angles of the phase shift, such as 0°, 60°, 120°, and so on to be performed in the roll-off filter 4 with respective tap coefficients. The ROM 131 actually stores data for specifying these tap coefficients for each phase deviation $\theta$ classified into 18 deviations (1 through 18), as an example. The right column $\theta_0$ displays angles of the phase jump, such as 0°, 20°, and 40°, to be applied to the baud rate clock. The ROM 131 actually stores data for specifying these phase jump angles for each phase deviation $\theta$.

The operations are as follows. Phase shift control for the roll-off filter 4 is carried out, in a range from 60° to 360°, for every 60°. On the other hand, the phase jump control for the baud rate clock is carried out, in a range from 0° to 60°, for every 20°. Thus, a coarse synchronous pull-in operation is achieved by the roll-off filter 4, while a fine synchronous pull-in operation is achieved by controlling the baud rate clock. For this, the ROM 131 produces, on one hand, control data concerning the phase jump angle $\theta_o$ in accordance with the phase deviation $\theta$ defined by the data $d_1$ through $d_6$ and, on the other hand, other control data concerning the phase shift in terms of the tap coefficients $C_1$ through $C_2$, also in accordance with the phase deviation $\theta$ defined by the same.

Thus, the roll-off filter 4 applies the phase shift to the received signal (timing signal) for every 60°, for the coarse control, as in the modified first embodiment. Simultaneously, the dividing ratio of the counter 82, formed as the frequency divider, is varied every 20°. Therefore, a phase jump is effected every 20° to the baud rate clock BC for the fine control.

In the second embodiment, the phase jump operation is achieved, as in the prior art, separate from the phase shift operation for the roll-off filter. Therefore, the previously mentioned deleterious transient response TRES (FIG. 4C) can occur due to the phase jump, as in the prior art. In actuality, however, the transient response TRES is negligible, because the phase jump angle is as small as 20°. Accordingly, the transient response duration can be considerably shortened compared with the duration occurring in the prior art.

The second embodiment has the advantage that the ROM 131 can be of a smaller capacity than the ROM 101, because most of the precise tap coefficient data can be cancelled by and replaced with the coarse phase jump angle data.

A receiver unit having a synchronous pull-in circuit according to a third embodiment of the present invention will be described below. The basic concept of this embodiment is derived from the following fact. Returning first to FIG. 7, two multipliers 31 and 32 are contained in the demodulator 3. Similar multipliers are also contained in the following stage, i.e., the roll-off filter 4. In view of the above, it is possible to combine both the multipliers of the demodulator 3 and the multipliers of the roll-off filter 4 and form a single part functioning as both the demodulator 3 and the roll-off filter 4. To be specific, the multiplying functions of the multipliers in the demodulator 3 are taken over by the multipliers in the roll-off filter. For this, the tap coefficients to be given to the roll-off filter 4 are modified to further include therein multiplying coefficients for demodulating the received signal.

The operations will be clarified by the following. Assume first that $Z_1, Z_2, Z_3 \ldots Z_n$ are data obtained by sampling a single tone carrier for the demodulation and assume next that $x_1, x_2, x_3 \ldots x_n$ are data obtained by samplying the received signal, which sampling is the same as the sampling to obtain the data $Z_1, Z_2, Z_3 \ldots Z_n$, respectively. By using the data, the demodulated data can be expressed as $x_1Z_1, x_2Z_2, x_3Z_3 \ldots x_nZ_n$. When the tap coefficients of the rollfilter are predetermined as $C_1, C_2, C_3 \ldots C_n$, the outputs $X_1, X_2, X_3 \ldots X_n$ from the roll-off filter can be expressed, using the previous data $x_1Z_1, x_2Z_2, \ldots x_nZ_n$, by the following equations (4).

$$\left.\begin{array}{l} X_1 = x_1Z_1C_1 + x_2Z_2C_2 + x_3Z_3C_3 + \ldots \\ \qquad + x_nZ_nC_n \\ X_2 = x_2Z_2C_1 + x_3Z_3C_2 + x_4Z_4C_3 + \ldots \\ \qquad + x_{n+1}Z_{n+1}C_n \\ \vdots \\ X_n = x_nZ_nC_1 + x_{n+1}Z_{n+1}C_2 + x_{n+2}Z_{n+2}C_3 + \ldots \\ \qquad + x_{n+n-1}Z_{n+n-1}C_n \end{array}\right\} \quad (4)$$

As understood from the above equations (4), the single part working as both the demodulator and the roll-off filter employs the thus modified tap coefficients shown below for respective multipliers instead of the usual tap coefficients $C_1, C_2, C_3 \ldots C_n$.

$$\left.\begin{array}{l} C_1Z_1, C_2Z_2, C_3Z_3 \ldots C_nZ_n \\ C_1Z_2, C_2Z_3, C_3Z_4 \ldots C_nZ_{n+1} \\ \vdots \\ C_1Z_n, C_2Z_{n+1}, C_3Z_{n+2} \ldots C_nZ_{n+n-1} \end{array}\right\} \quad (5)$$

In this case the single part is required to cooperate with a particular coefficient table ROM similar to the aforesaid ROM's 74, 101, and 131. The coefficient table ROM stores therein the modified tap coefficients recited in the above row (5). From this viewpoint, it is considered that the coefficient table ROM must be of a large capacity so as to accommodate therein the great amount of the modified tap coefficient data. Practically, therefore, the data amount should be reduced by, for example, the following method. For explanation, two cases A and B are taken into consideration, as shown in the following table.

TABLE

|  | A | B |
| --- | --- | --- |
| Sampling frequency (Hz) | 9600 | 7200 |
| Carrier frequency (Hz) | 1700 | 1800 |
| Number of samplings | 96 | 4 |

In case A, the ratio between the sampling frequency and the carrier frequency is 96/17 (=9600/1700). Therefore, the number of samplings in every 17 cycles of the carrier frequency becomes as large as 96. However, in case B, the ratio between the sampling frequency and the carrier frequency is 4/1 (=7200/1800). Therefore, the number of samplings in evey cycle of the carrier frequency becomes 4.

The concept of the third embodiment will further be explained with reference to the related figures.

Figure 21A:
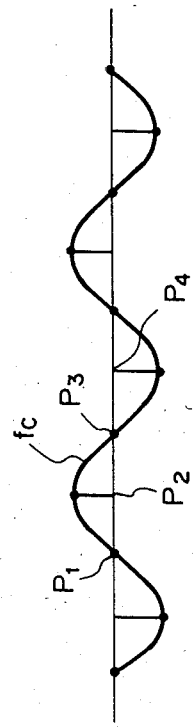
FIGS. 21A, 21B, and 21C are explanatory views for clarifying the concept of the third embodiment.
Figure 21B:
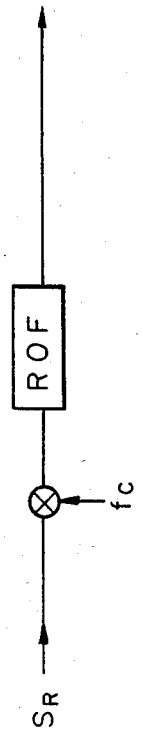
Figure 21C:
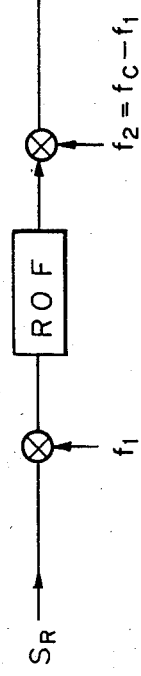

FIGS. 21A, 21B and 21C are explanatory views for clarifying the concept of the third embodiment. With reference to FIG. 21A and the aforesaid number 4 of the sampling under case B, the four sampling points can be positioned along the curve of a carrier frequency $f_c$, as shown by $P_1, P_2, P_3$, and $P_4$. In this case, the four sampling points $P_1, P_2, P_3$, and $P_4$ assume the sampled values 0, +1, 0, and −1, respectively. This means that half of the sampled values assume 0. Accordingly, the aforesaid tap coefficient table ROM is not required to store all the data recited in the above row (5), but only half of them. This has the advantages, other than an advantage that the multiplying operations to be achieved by a conventional demodulator can be completely eliminated, that, first, the multiplying operations to be achieved by the roll-off filter can be halved due to the presence of 0 for half of the stored data and, second, the capacity of the tap coefficient ROM can be minimized to half.

It may be considered that the third embodiment is effective only under case B and therefore the carrier frequency must always be determined with a fixed relationship relative to the sampling frequency. In actuality, however, the carrier frequency is not limited to 1800 Hz and varies with each data transmission system.

The problem mentioned above can be solved in the following way. Referring first to FIG. 21B, in the conventional method, the received signal $S_R$ is mixed with the carrier frequency $f_c$ and then the thus mixed signal is processed in a roll-off filter ROF. Contrary to the above, in the third embodiment, the received signal $S_R$ is not mixed with the carrier frequency per se, but a predetermined carrier intermediate frequency $f_1$. The carrier intermediate frequency $f_1$ is preset as a frequency close to $f_c$ and simultaneously satisfies an equation $f_1 = f_s/M$, where $f_s$ denotes a sampling frequency and M a positive integer larger than or equal to 2. If the values $f_s$, $f_1$, and M are selected as 7200, 1800, and 4, respectively, this case is identical to the previous case B. In general, the sampling frequency $f_s$ is predetermined for each receiver unit and constant, therefore, the integer M is selected in such a manner that the value $f_s/M$ is approximately $f_c$ allotted to the related transmission system, and finally the frequency $f_1$ is determined. By using the thus determined intermediate frequency $f_1$, many sampling points of value 0 can be produced, as shown in FIG. 21A. In other words, the roll-off filter ROF of FIG. 21C operates on the so-called IF stage. Therefore, the output from the roll-off filter must be recovered with the original carrier frequency $f_c$. For this, the output from the filter is mixed again with a carrier recovery frequency $f_2$. The frequency $f_2$ is predetermined to satisfy an equation $f_2 = f_c - f_1$. The mixture of $f_c - f_1$ and $f_1$ will produce $f_c$.

As explained above in detail, the present invention completely eliminates the undesired transient response or suppresses the same to some extent. This means that a high speed synchronous pull-in operation is attained. Accordingly, the training signal duration can be shortened, so that the data signal duration can be extended. As a result, the transmission efficiency of data can be improved.

We claim:

1. A receiver unit having a synchronous pull-in circuit, comprising: a demodulator for demodulating a received signal with a carrier; a transversal filter having a roll-off characteristic, i.e., a roll-off filter, for transforming the demodulated signal in the form of an impulse response therefor by adjusting its tap coefficients; a timing discriminator for extracting a timing signal contained in the output from the roll-off filter; and a decision part for detecting a phase deviation between the thus extracted timing signal and an internal clock by which the receiver unit itself is synchronized, characterized in that
the synchronous pull-in circuit is formed with both the decision part and the roll-off filter, which roll-off filter is operative to apply a phase shift to the received signal given from the demodulator by adjusting its tap coefficients in accordance with the phase deviation determined by the decision part, whereby the timing signal of the received signal is synchronously pulled-in to the internal clock.

2. A receiver unit as set forth in claim 1, wherein a line is connected between the decision part and the roll-off filter so as to vary the tap coefficients of the roll-off filter in response to the decision output from the decision part.

3. A receiver unit as set forth in claim 2, wherein the demodulator is comprised of a real side multiplier and an imaginary side multiplier to produce a real side baseband signal and an imaginary side baseband signal, respectively; the roll-off filter is comprised of a real side roll-off filter and an imaginary side roll-off filter to produce real side and imaginary side filtered outputs, respectively; the timing discriminator is comprised of a real side bandpass filter, a real side square circuit connected thereto, both dealing with the real side filtered output, an imaginary side bandpass filter, an imaginary side square circuit connected thereto, both dealing with the imaginary side filtered output, an adder for adding both outputs from said real side and imaginary side square circuits, another bandpass filter being operative to receive the output from said adder and produce a real side timing component, and a 90° phase rotation part connected to the output of the bandpass filter to produce an imaginary side timing component.

4. A receiver unit as set forth in claim 3, wherein said decision part comprises: a real side polarity decision part and an imaginary side polarity decision part which respectively receive said real side and imaginary side timing components, and thereby produce polarity decision data; an absolute value generator being operative to receive said real side and imaginary side timing components and produce the absolute values of these timing components; a plurality of multipliers which commonly receive the absolute values of the timing components, each of which multipliers multiplying the absolute value by different values of phase rotation from each other; a plurality of vector decision parts receiving the outputs from the multipliers for the phase rotation, respectively, and thereby producing phase decision data; and a read-only memory (ROM) which receives, as an address, said polarity decision data and phase decision data and produces the tap coefficients specified by these data, which tap coefficients are supplied to said roll-off filter.

5. A receiver unit as set forth in claim 4, wherein each of said vector decision parts comprises: a real side absolute value generator and an imaginary side absolute value generator receiving respectively the real side and imaginary side outputs given from the corresponding one of said phase rotation multipliers; a multiplier which multiplies the output from the real side absolute value generator by a predetermined value for applying a predetermined phase rotation to the real side timing component produced from the real side absolute value generator; an adder being operative to subtract the value from the phase rotation multiplier of the real side timing component by the value from the imaginary side absolute value generator of the imaginary side timing component; and a polarity decision part being operative to receive the output from the adder for subtraction and to produce said phase decision data.

6. A receiver unit as set forth in claim 4, wherein said ROM stores the tap coefficient data in relation with each of all the predetermined phase deviations accessed by both said polarity decision data and phase decision data given, as an address, thereto.

7. A receiver unit as set forth in claim 4, wherein said ROM cooperates with both a random-access memory (RAM) and an address controller, the ROM has therein a first region and a second region, the first region receives, as an address, both said polarity decision data and the phase decision data and produces the corresponding one of said phase deviation data which is given to the address controller, the second region stores therein several sets of the tap coefficients and corresponding one of the tap coefficient sets is read therefrom in accordance with the polarity and phase decision data and loaded in the RAM, and each tap position of the thus loaded tap coefficient set is shifted, in the RAM, by an amount defined by the address controller.

8. A receiver unit as set forth in claim 4, wherein said ROM cooperates with both a random-access memory and an address controller, the ROM has therein a first region and a second region, the first region receives, as an address, both said polarity decision data and the phase decision data and produces the corresponding one of said phase deviation data which is given to the address controller, the second region stores therein a single set of the tap coefficient data, the number of the tap positions therefor is set larger than the number of the taps with which said roll-off filter is set up, the address controller is operative to move the tap positions parallely by an amount determined in accordance with the phase deviation data, and the RAM produces the thus moved tap coefficient data.

9. A receiver unit as set forth in claim 2, wherein said roll-off filter comprises: series-connected multistage delay circuits; a plurality of multipliers which multiply respective outputs from the delay circuits by individual tap coefficients given from said decision part; a rear side adder being operative to add outputs given from said multipliers of the rear side; a front side adder being operative to add outputs given from said multipliers of the front side, the front side adder being operative to further add the result from the rear side adder; a multiplier which multiplies the result from the front side adder by a predetermined constant (1/K), and an adder which receives the result from the multiplier with the predetermined constant (1/K) and also the output from a center side multiplier located between said rear side and front side multipliers and connected with said delay circuit of the center side, to produce the output to be supplied to said timing discriminator, in which each of the tap coefficients given to said rear side and front side multipliers is multiplied in advance by a predetermined constant (K), where K is a positive integer larger than 1.

10. A receiver unit having a synchronous pull-in circuit, comprising: an analog/digital (A/D) converter for converting a received signal into a digital form with a sampling clock; a demodulator for demodulating the output from the A/D converter with a carrier; a transversal filter having a roll-off characteristic, i.e., a roll-off filter, for transforming the demodulated signal in the form of an impulse response therefor by adjusting its tap coefficients; a timing discriminator for extracting a timing signal contained in the output from the roll-off filter; a decision part for detecting a phase deviation between the thus extracted timing signal and an internal clock by which the receiver unit itself is synchronized; and a phase-locked loop (PLL) part which is controlled by the output from the decision part to produce said internal clock for generation of said sampling clock to be given to said A/D converter, characterized in that
the synchronous pull-in circuit is formed with the decision part, the roll-off filter, and the PLL part, which roll-off filter is operative to apply a phase shift to the received signal given from the demodulator by adjusting its tap coefficients in accordance with the phase deviation determined by the decision part, also the PLL part is operative to apply a phase jump to the internal clock so as to shift the sampling phase of said sampling clock, whereby the timing signal of the received signal is synchronized with the internal clock.

11. A receiver unit as set, forth in claim 10, wherein a first line is connected between the decision part and the roll-off filter so as to vary the tap coefficients of the roll-off filter in response to the decision output from the decision part, and a second line is connected between the PLL part and the A/D converter so as to vary the sampling phase by said phase jump, the second line commonly transferring a usual control signal for fine adjustment in frequency of the sampling clock in accordance with a usual error signal defined by said phase deviation.

12. A receiver unit as set forth in claim 11, wherein the demodulator is comprised of a real side multiplier and an imaginary said multiplier to produce a real side baseband signal and an imaginary side baseband signal, respectively; the roll-off filter is comprised of a real side roll-off filter and an imaginary side roll-off filter to produce real side and imaginary side filtered outputs, respectively; the timing discriminator is comprised of a real side bandpass filter, a real side square circuit connected thereto, both deal with the real side filtered output, an imaginary side bandpass filter, an imaginary side square circuit connected thereto, both deal with the imaginary side filtered output, an adder for adding both outputs from said real side and imaginary side square circuits, another bandpass filter being operative to receive the output from said adder and produce a real side timing component, and a 90° phase rotation part connected to the output of the bandpass filter to produce an imaginary side timing component.

13. A receiver unit as set forth in claim 12, wherein said decision part comprises: a real side polarity decision part and an imaginary side polarity decision part which respectively receive said real side and imaginary side timing components, and thereby produce polarity decision data; an absolute value generator being operative to receive said real side and imaginary side timing components and produce the absolute values of these timing components; a plurality of multipliers which commonly receive the absolute values of the timing components, each of which multipliers multiplying the absolute value by different values of phase rotation from each other; a plurality of vector decision parts receiving the outputs from the multipliers for the phase rotation, respectively, and thereby producing phase decision data; and a read only memory (ROM) which receives, as an address, said polarity decision data and phase decision data and produces, other than said error signal, the tap coefficients specified by these data, which tap coefficients are supplied to said roll-off filter.

14. A receiver unit as set forth in claim 13, wherein said PLL part is comprised of a lead/lag controller and a counter having a clock source, the lead/lag controller receiving, on one hand, said error signal and, on the other hand, the phase deviation data given from said ROM to perform the phase jump and applying an output to the counter which is formed as a frequency divider for the clock given from said clock source with a dividing ratio determined by the output from the lead/lag controller.

15. A receiver unit as set forth in claim 1, wherein said demodulator and said roll-off filter are combined together to form a single part.

16. A receiver unit as set forth in claim 15, wherein said single part is basically formed as a roll-off filter comprising: series-connected multistage delay circuits; a plurality of multipliers which multiply respective outputs from the delay circuits by individual tap coefficients given from said decision part; and an adder being operative to add outputs given from said multipliers to produce filtered output, in which said tap coefficients are determined to include, as a whole, coefficients relating to said demodulator, simultaneously.

17. A receiver unit as set forth in claim 10, wherein said demodulator and said roll-off filter are combined together to form a single part.

18. A receiver unit as set forth in claim 17, wherein said single part is basically formed as the roll-off filter comprising: series-connected multistage delay circuits; a plurality of multipliers which multiply respective outputs from the delay circuits by individual tap coefficients given from said decision part; and an adder being operative to add outputs given from said multipliers to produce filtered output, in which said tap coefficients are determined to include, as a whole, coefficients relating to said demodulator, simultaneously.

19. A receiver unit having a synchronous pull-in circuit, the synchronous pull-in circuit comprised of, as a major part, a transversal filter having a roll-off characteristic, i.e., a roll-off filter, a timing discriminator for extracting a timing signal contained in a received signal, and a decision part for detecting a phase deviation between the thus extracted timing signal and an internal clock by which the receiver unit itself is synchronized, said roll-off filter provided with a plurality of taps, the tap coefficients of which are varied in accordance with said phase deviation, so that said timing signal is synchronized with said internal clock.

20. A method for achieving synchronous pull-in operation in a receiver unit, primarily comprised of the following two steps:
determining a suitable roll-off characteristic for a received signal, achieved by using three processes, i.e., a process for filtering the received signal with the roll-off characteristic, a process for extracting a timing signal contained in the received signal, and a process for detecting a phase deviation between the timing signal and an internal clock by which the receiver unit is synchronized;
varying the roll-off characteristic in said filtering step in such a manner as to align in phase the timing signal with the internal clock.

21. A method for achieving synchronous pull-in operation in a receiver unit, comprising the steps of:
demodulating a received signal with a carrier;
filtering a received signal with a roll-off characteristic;
extracting a timing signal contained in the received signal;
detecting a phase deviation between the timing signal and an internal clock by which the receiver unit is synchronized;
varying the roll-off characteristic in said filtering step in such a manner as to align in phase the timing signal with the internal clock.

22. A method for achieving synchronous pull-in operation in a receiver unit, comprising the steps of:
sampling a received signal with a sampling clock;
demodulating each sampled signal with a carrier;
filtering the demodulated signal with a roll-off characteristic;
extracting a timing signal contained in the received signal;
detecting a phase deviation between the timing signal and an internal clock by which the receiver unit is synchronized;
adjusting the relative phase between the timing signal and the internal clock, first by varying the roll-off characteristic through a phase shift defined by the phase deviation and second by applying a phase jump to the sampling clock in accordance with this phase deviation.

23. A method as set forth in claim 22, wherein, in the step of adjusting the relative phase, said phase jump for the adjustment is achieved with every small step of the phase deviation, while said phase shift for the adjustment is achieved with every large step of the phase deviation.

24. A method for achieving synchronous pull-in operation in a receiver unit, comprising the steps of:
transforming in waveform a received signal by simultaneous demodulation with a carrier and filtering of the received signal with a roll-off characteristic;
extracting a timing signal contained in the received signal;
detecting a phase deviation between the timing signal and an internal clock by which the receiver unit is synchronized; and
varying the roll-off characteristic in said filtering step in such a manner as to align in phase the timing signal with the internal clock.

25. A method for achieving synchronous pull-in operation in a receiver unit, comprising the steps of:
sampling a received signal with a sampling clock;
transforming in waveform a received signal by simultaneous demodulation with a carrier and filtering of the received signal with a roll-off characteristic;
extracting a timing signal contained in the received signal;
detecting a phase deviation between the timing signal and an internal clock by which the receiver unit is synchronized; and
adjusting the relative phase between the timing signal and the internal clock, first by varying the roll-off characteristic through a phase shift defined by the phase deviation and second by applying a phase jump to the sampling clock in accordance with this phase deviation.

26. A method as set forth in claim 25, wherein, in the step of adjusting the relative phase, said phase jump for the adjustment is achieved with every small step of the phase deviation, while said phase shift for the adjustment is achieved with every large step of the phase deviation.

* * * * *

UNITED STATES PATENT AND TRADEMARK OFFICE
CERTIFICATE OF CORRECTION

PATENT NO. : 4,607,230
DATED : August 19, 1986
INVENTOR(S) : Kaku et al.

It is certified that error appears in the above-identified patent and that said Letters Patent is hereby corrected as shown below:

```
Column 6, line 19, "FIGURE" should be --Figure--.
Column 9, line 19, "2π16(6" should be --2π/6 (6--.
Column 14, line 40, delete "35".
Column 17, line 67, "rollfilter" should be --roll-off filter--.
Column 22, line 14, "set," should be --set--.
```

Signed and Sealed this

Twenty-seventh Day of January, 1987

Attest:

DONALD J. QUIGG

Attesting Officer     Commissioner of Patents and Trademarks